(12) United States Patent
Shinohara et al.

(10) Patent No.: US 7,715,112 B2
(45) Date of Patent: May 11, 2010

(54) ZOOM LENS SYSTEM AND IMAGE PICKUP APPARATUS INCLUDING THE SAME

(75) Inventors: Kenji Shinohara, Utsunomiya (JP); Kenji Obu, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 12/186,412

(22) Filed: Aug. 5, 2008

(65) Prior Publication Data
US 2009/0040625 A1 Feb. 12, 2009

(30) Foreign Application Priority Data
Aug. 6, 2007 (JP) .............................. 2007-203963

(51) Int. Cl.
*G02B 15/14* (2006.01)
*G02B 27/64* (2006.01)

(52) U.S. Cl. .................. 359/687; 359/684; 359/685; 359/686; 359/557

(58) Field of Classification Search ................. 359/557, 359/684, 685, 686, 687
See application file for complete search history.

(56) References Cited

U.S. PATENT DOCUMENTS

| 7,333,274 B2 | 2/2008 | Hozumi | |
| 7,471,460 B2 * | 12/2008 | Saruwatari | 359/687 |
| 7,545,580 B2 * | 6/2009 | Saruwatari | 359/687 |
| 7,630,144 B2 * | 12/2009 | Shinohara | 359/687 |
| 2007/0091460 A1 | 4/2007 | Saruwatari et al. | |

FOREIGN PATENT DOCUMENTS

| JP | 8-50244 | 2/1996 |
| JP | 2006-308649 | 11/2006 |
| JP | 2007-108544 | 4/2007 |

* cited by examiner

*Primary Examiner*—David N Spector
(74) *Attorney, Agent, or Firm*—Canon USA Inc IP Div

(57) ABSTRACT

A zoom lens system includes, in order from an object side to an image side, first, second, third, and fourth lens units having positive, negative, positive, and positive optical powers, respectively. The first lens unit includes one negative lens element and two positive lens elements, and moves during zooming. The zoom lens system satisfies the following condition:

$$0.05 < f1/(st1 \times ft/fw) < 0.2$$

$$1.5 < \beta 3T/\beta 3W < 3.6$$

where f1 denotes a focal length of the first lens unit, st1 denotes a distance between positions of the first lens unit at a wide-angle end and at a telephoto end, fw and ft denote focal lengths of the entire system at the wide-angle end and at the telephoto end, respectively, and β3W and β3T denote lateral magnifications of the third lens unit at the wide-angle end and at the telephoto end, respectively.

8 Claims, 29 Drawing Sheets

ZOOM LENS SYSTEM AND IMAGE PICKUP APPARATUS INCLUDING THE SAME

BACKGROUND OF THE INVENTION

1. Field of the Invention

The present invention relates to zoom lens systems and image pickup apparatuses including the same suitable for video cameras, digital still cameras, broadcast cameras, silver-halide-film cameras, and the like.

2. Description of the Related Art

Recent image pickup apparatuses, such as cameras including video cameras, digital still cameras, broadcast cameras having solid-state image pickup devices and cameras used with silver-halide films, have high functionality and are of small size. Zoom lens systems serving as image taking optical systems to be included in such image pickup apparatuses are desired to be compact with a short total length and a high resolution.

Further, such zoom lens systems are desired to have a wide angle of view and a high zoom ratio.

In response to such demands, there is a known four-unit zoom lens system that includes four lens units, in which a first lens unit having a positive optical power, a second lens unit having a negative optical power, a third lens unit having a positive optical power, and a fourth lens unit having a positive optical power are arranged in that order from an object side to an image side.

As examples of such a four-unit zoom lens system, U.S. Pat. No. 7,333,274 and Japanese Patent Laid-Open No. 8-50244 disclose rear-focusing four-unit zoom lens systems, in which a first lens unit, a second lens unit, and a third lens unit are moved to change the magnification while a fourth lens unit corrects variations in an image plane caused by the change of magnification and performs focusing.

Further, among such rear-focusing four-unit zoom lens systems, US Patent Application Publication No. 2007/0091460 discloses a zoom lens system in which a still image is obtained while the entirety of a third lens unit is shifted in a direction perpendicular to the optical axis.

In general, the size of a zoom lens system can be reduced by reducing the number of lens elements while increasing the optical power of each of the lens units included in the zoom lens system.

However, lens elements of a zoom lens system configured in such a manner tend to become thick because of the increase in the optical power of each of the lens units. Therefore, the total length of the zoom lens system may not be reduced sufficiently and correction of various aberrations may become difficult.

To realize a high zoom ratio, compactness of the entire zoom lens system, and satisfactory optical performance in the rear-focusing four-unit zoom lens systems described above, it is important to make appropriate settings for each of the lens units, including the optical power and lens configuration.

In the rear-focusing four-unit zoom lens systems described above, it is particularly important to make appropriate settings of the optical power, lens configuration, and moving distance of the first lens unit that moves during zooming, the lateral magnification of the third lens unit, and so forth. If these settings are not appropriate, it is very difficult to realize high optical performance throughout a zoom range while maintaining a high zoom ratio.

SUMMARY OF THE INVENTION

The present invention provides a zoom lens system of small size capable of realizing high optical performance throughout a zoom range. The present invention also provides an image pickup apparatus including such a zoom lens system.

According to an aspect of the present invention, a zoom lens system includes, in order from an object side to an image side, a first lens unit having a positive optical power, the first lens unit including one negative lens element and two positive lens elements, a second lens unit having a negative optical power, a third lens unit having a positive optical power, and a fourth lens unit having a positive optical power. The first lens unit moves during zooming. In the zoom lens system, the following condition is satisfied:

$$0.05 < f1/(st1 \times ft/fw) < 0.2$$

$$1.5 < \beta 3T/\beta 3W < 3.6$$

where f1 denotes a focal length of the first lens unit, st1 denotes a distance between positions of the first lens unit at a wide-angle end and at a telephoto end, fw and ft denote focal lengths of the entire system at the wide-angle end and at the telephoto end, respectively, and $\beta 3W$ and $\beta 3T$ denote lateral magnifications of the third lens unit at the wide-angle end and at the telephoto end, respectively.

Further features of the present invention will become apparent from the following description of exemplary embodiments (with reference to the attached drawings).

DESCRIPTION OF THE EMBODIMENTS

Embodiments of a zoom lens system and an image pickup apparatus including the same according to the present invention will now be described.

Zoom lens systems according to first to seventh embodiments of the present invention each include, in order from an object side to an image side, a first lens unit having a positive optical power (refractive power), a second lens unit having a negative optical power (refractive power), a third lens unit having a positive optical power, and a fourth lens unit having a positive optical power. At least the first lens unit moves during zooming. In each of the first to seventh embodiments of the present invention, zooming is performed by moving all of the first to fourth lens units. However, the present invention is not limited to such a configuration. For example, zooming may be performed by moving the first, second, and third lens units; the first, second, and fourth lens units; or the first, third, and fourth lens units.

Figure 1:
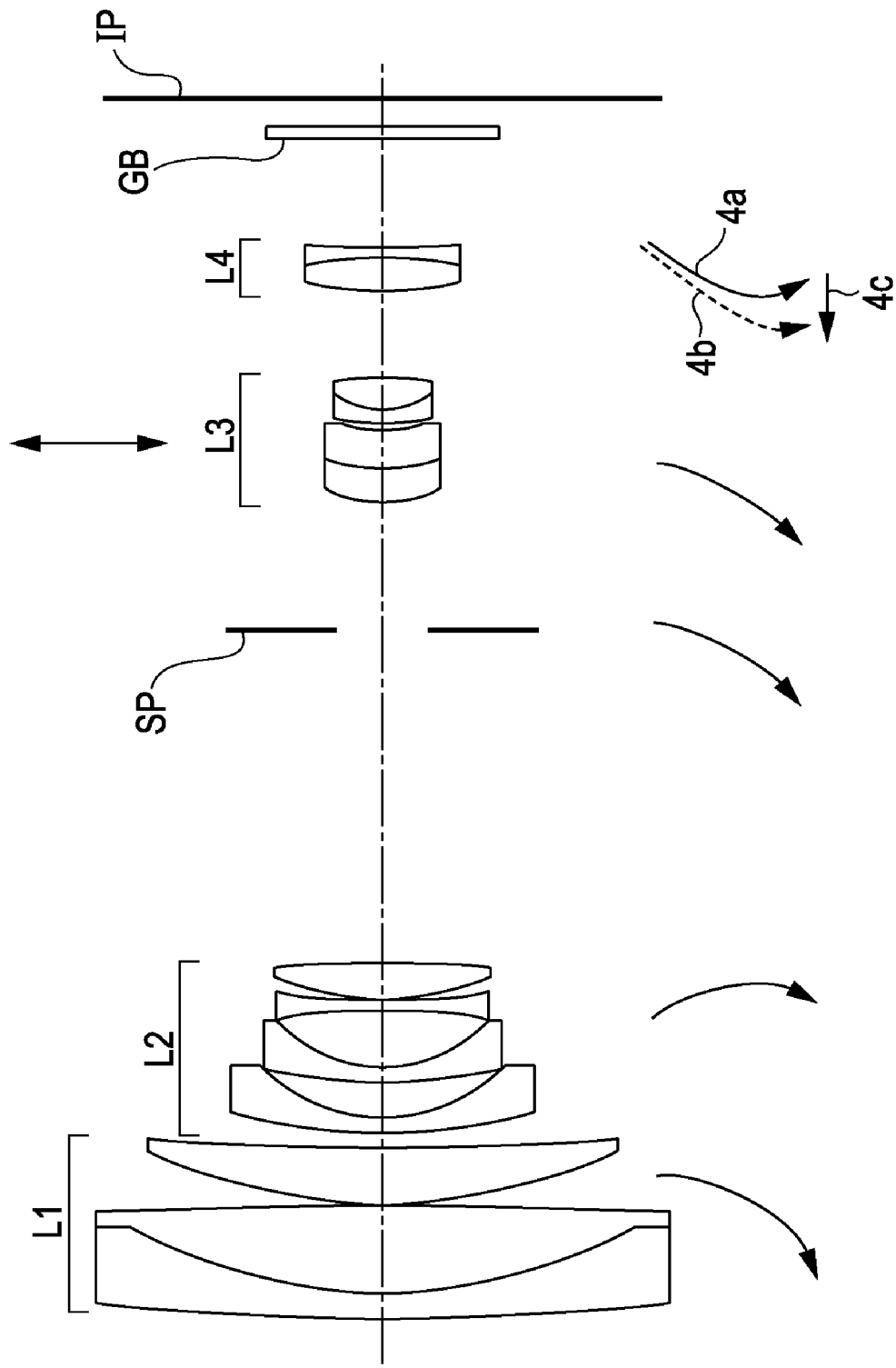
FIG. 1 is a sectional view of a zoom lens system according to a first embodiment of the present invention at a wide-angle end.

FIG. 1 is a sectional view of a zoom lens system according to the first embodiment of the present invention at a wide-angle end (short-focal-length end).

Figure 2:
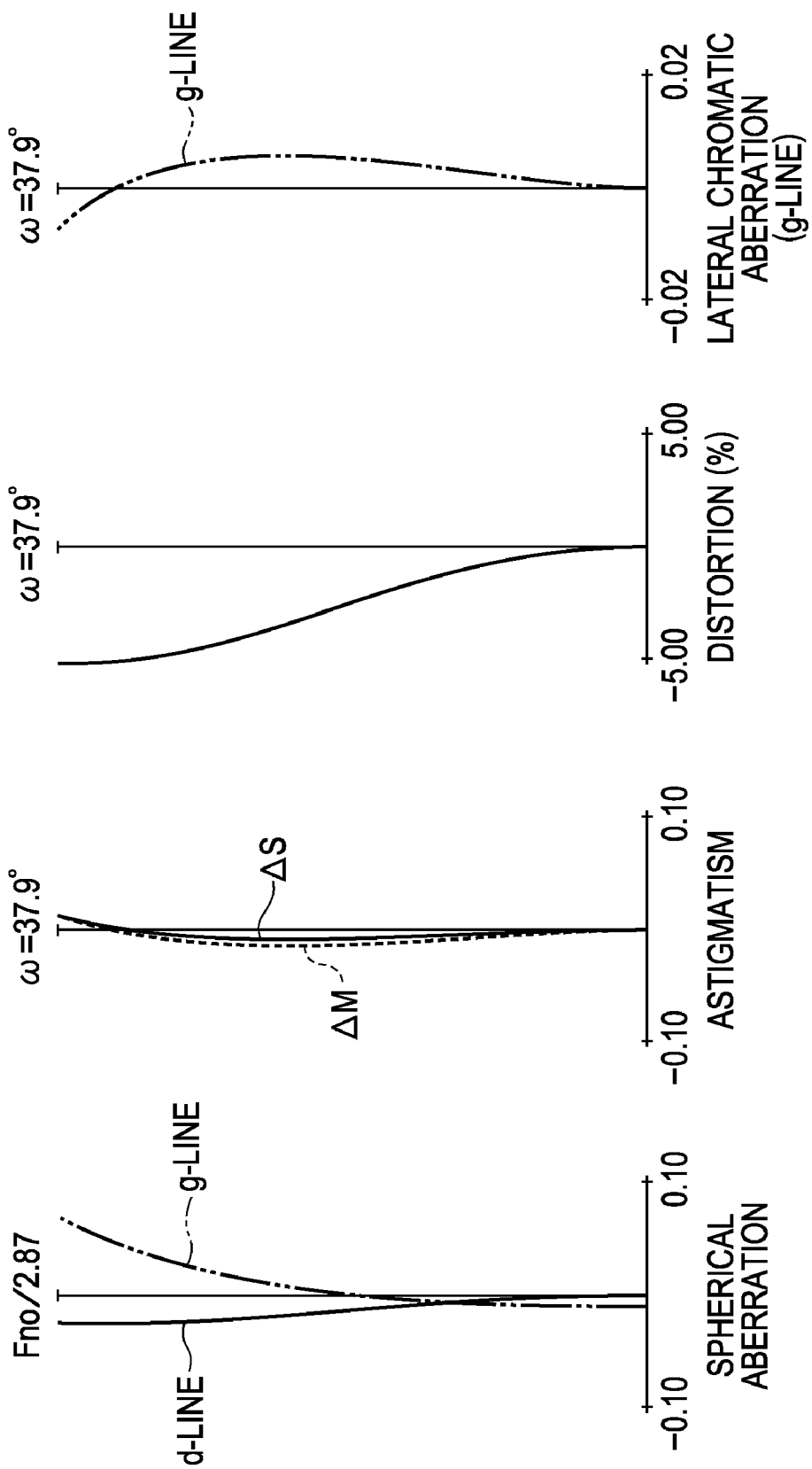
FIG. 2 is a diagram showing aberrations of the zoom lens system of the first embodiment corresponding to Numerical Example 1 at the wide-angle end.
Figure 3:
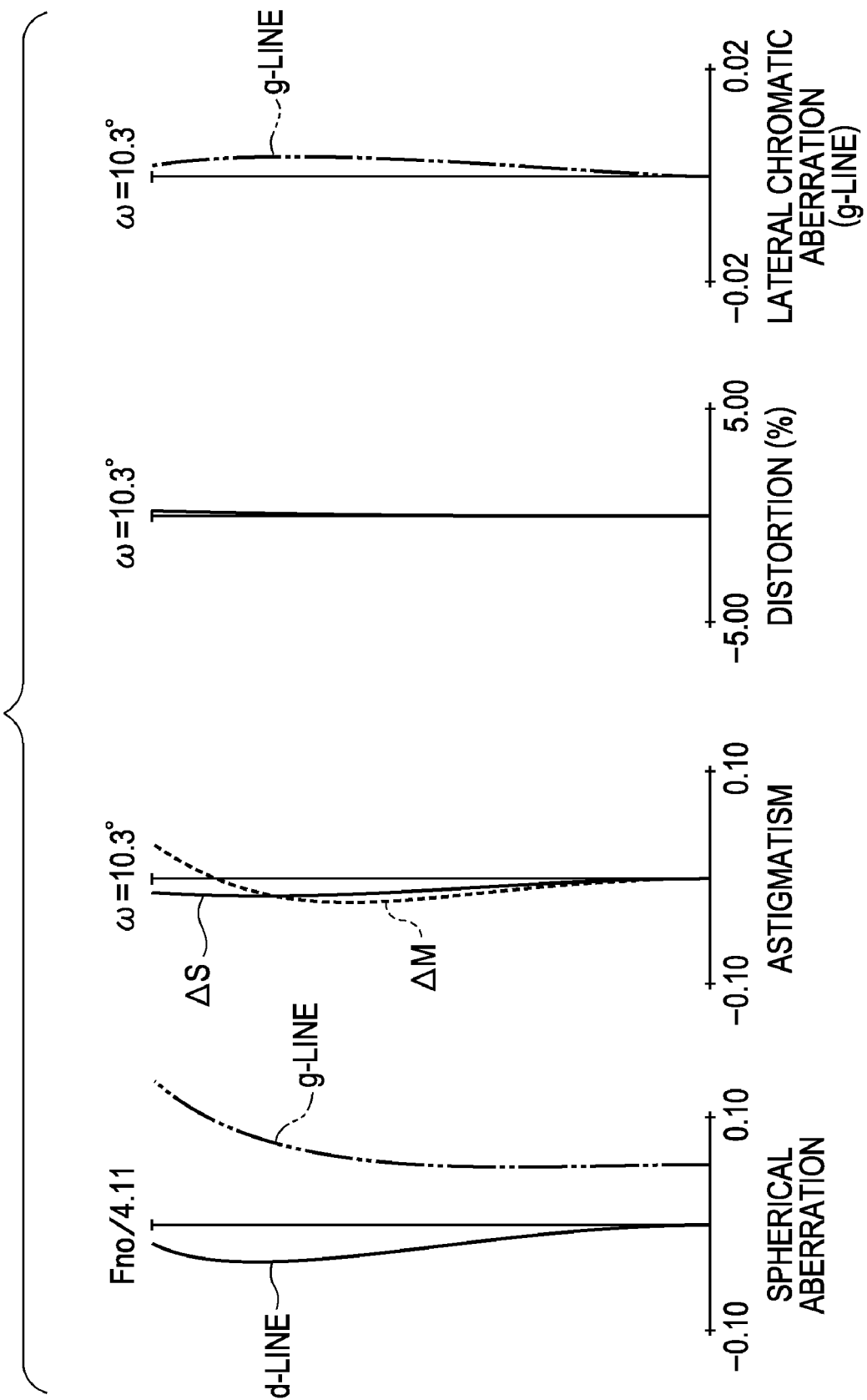
FIG. 3 is a diagram showing aberrations of the zoom lens system of the first embodiment corresponding to Numerical Example 1 at an intermediate zoom position.
Figure 4:
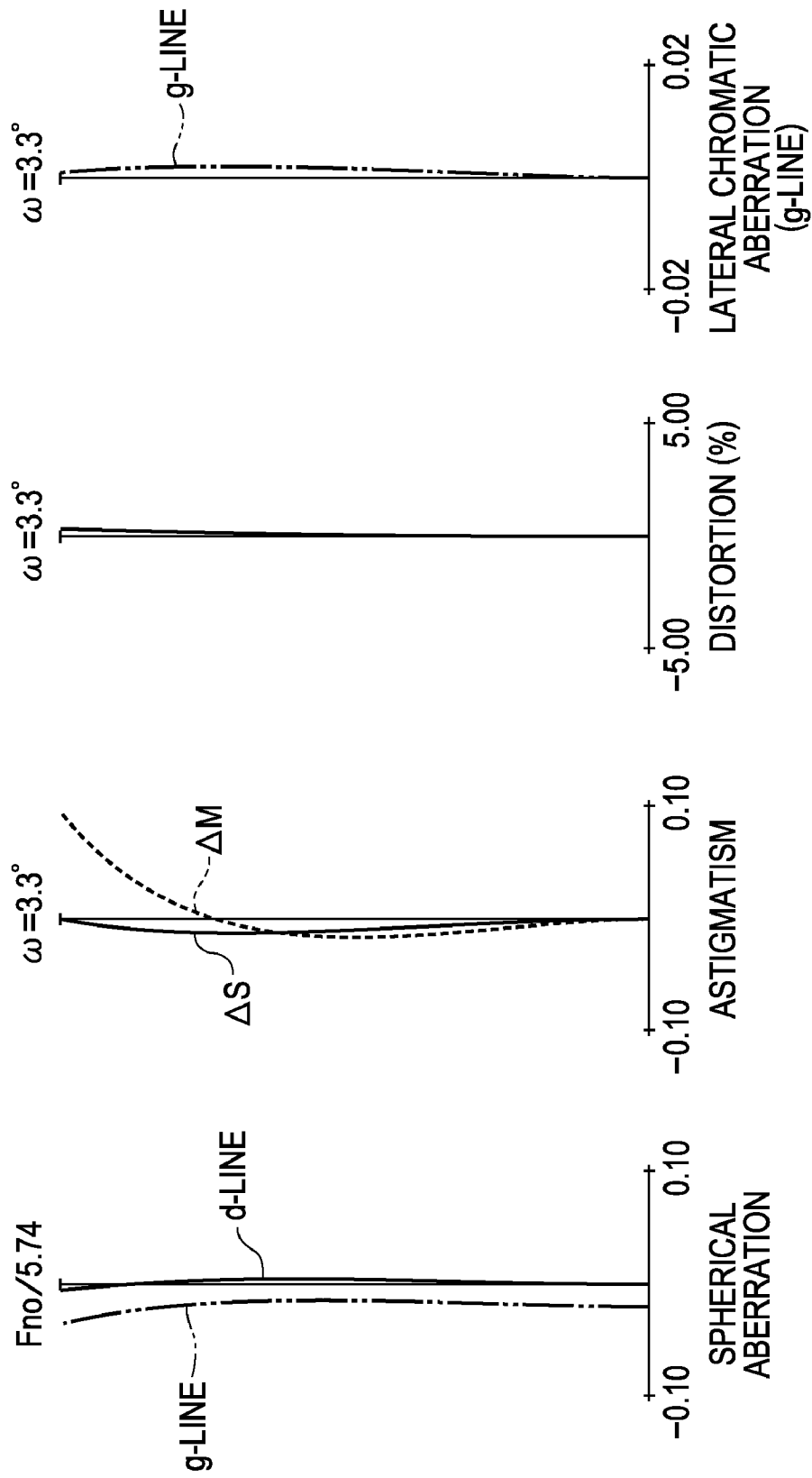
FIG. 4 is a diagram showing aberrations of the zoom lens system of the first embodiment corresponding to Numerical Example 1 at a telephoto end.

FIGS. 2 to 4 are diagrams showing aberrations of the zoom lens system according to the first embodiment at the wide-angle end, at an intermediate zoom position, and at a telephoto end (long-focal-length end), respectively.

Figure 5:
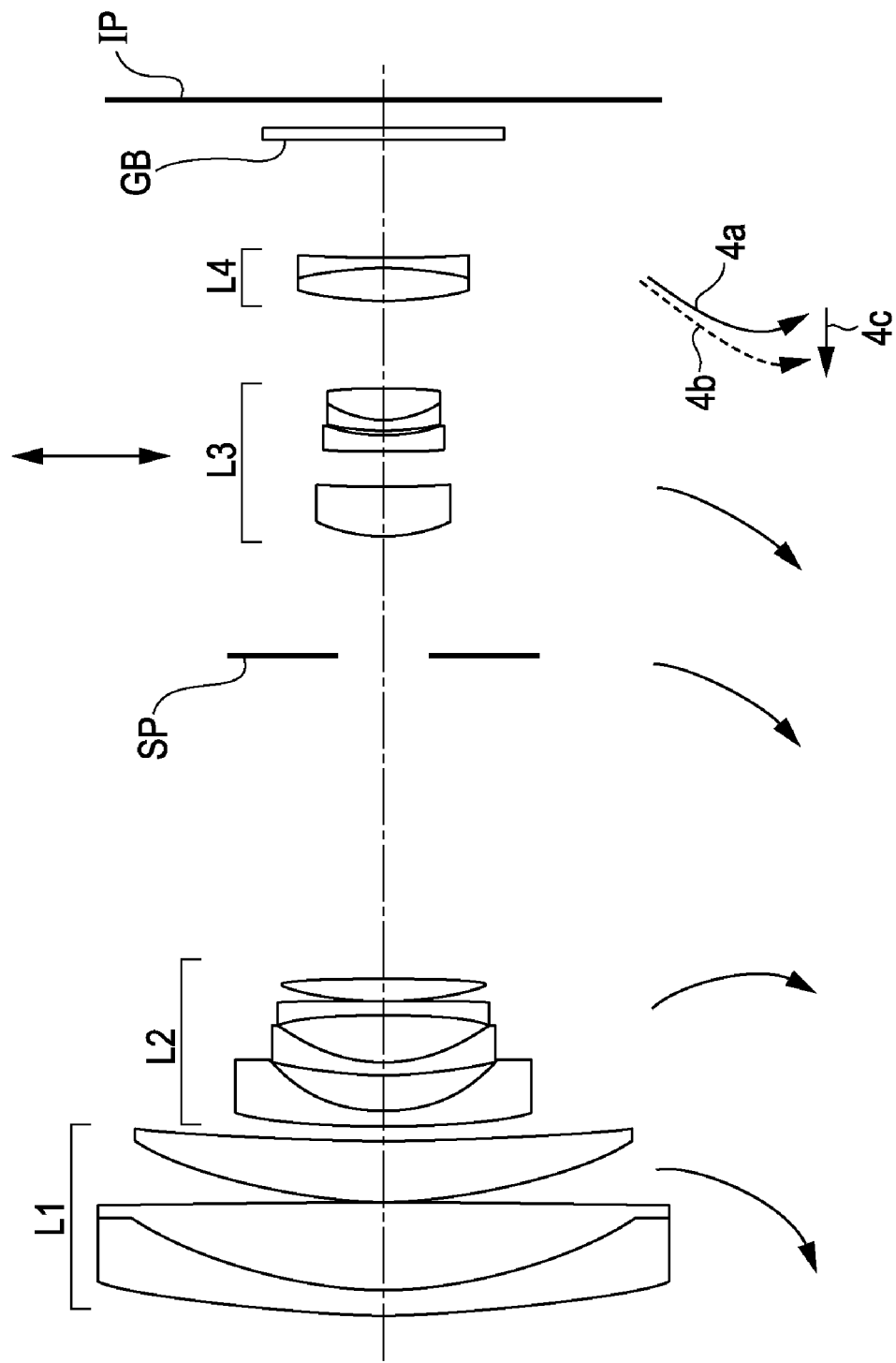
FIG. 5 is a sectional view of a zoom lens system according to a second embodiment of the present invention at a wide-angle end.
Figure 6:
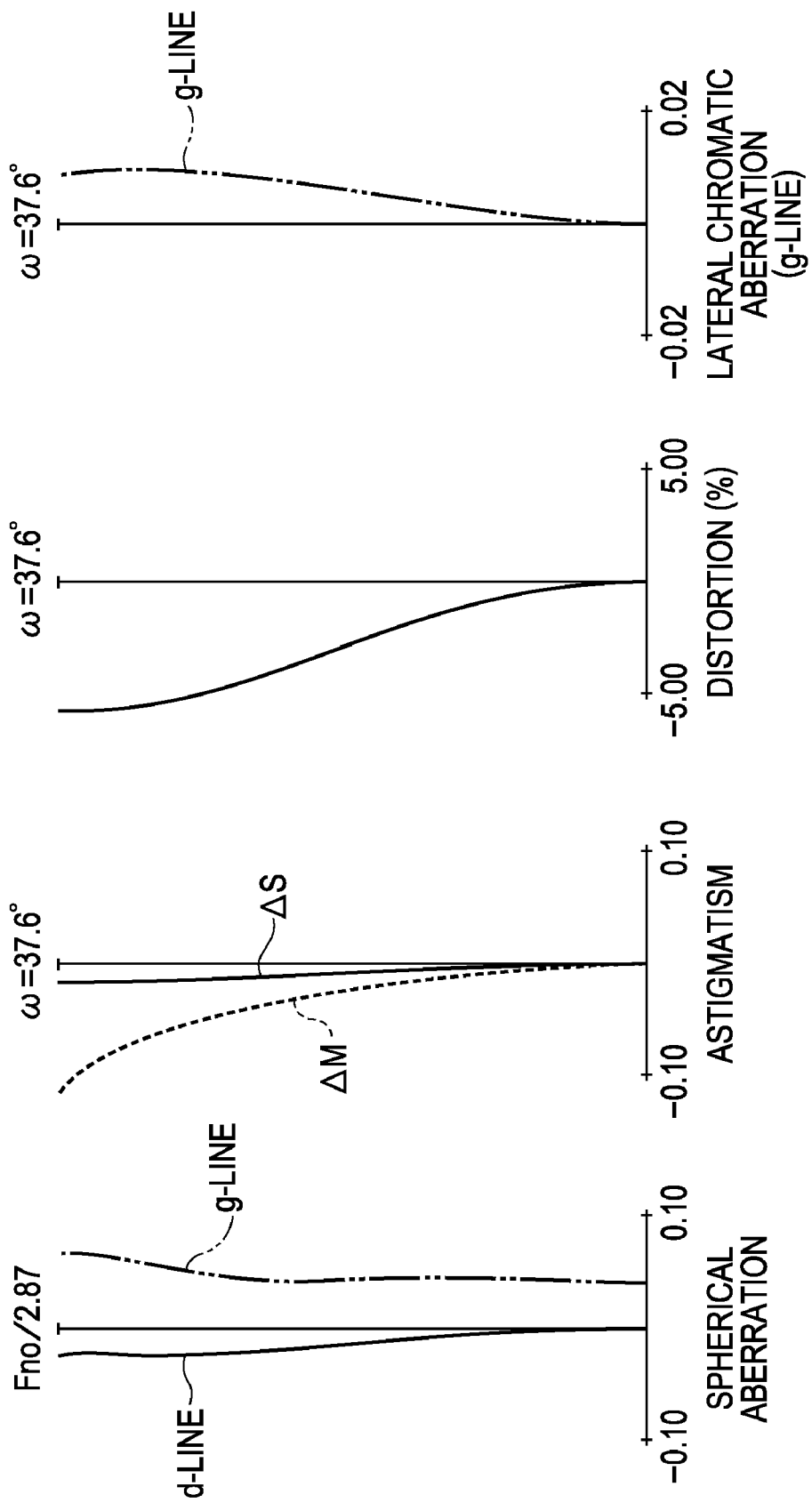
FIG. 6 is a diagram showing aberrations of the zoom lens system of the second embodiment corresponding to Numerical Example 2 at the wide-angle end.
Figure 7:
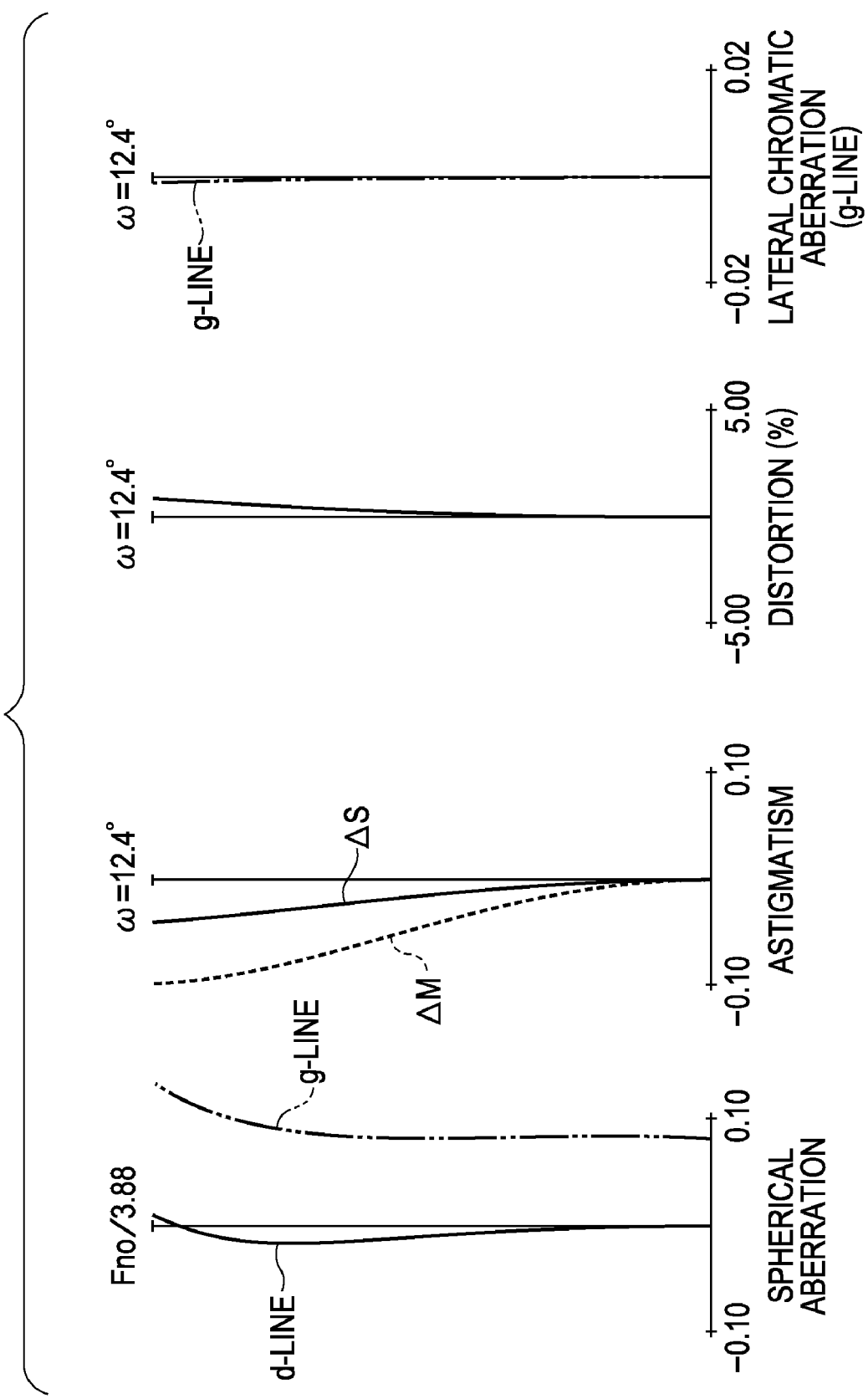
FIG. 7 is a diagram showing aberrations of the zoom lens system of the second embodiment corresponding to Numerical Example 2 at an intermediate zoom position.
Figure 8:
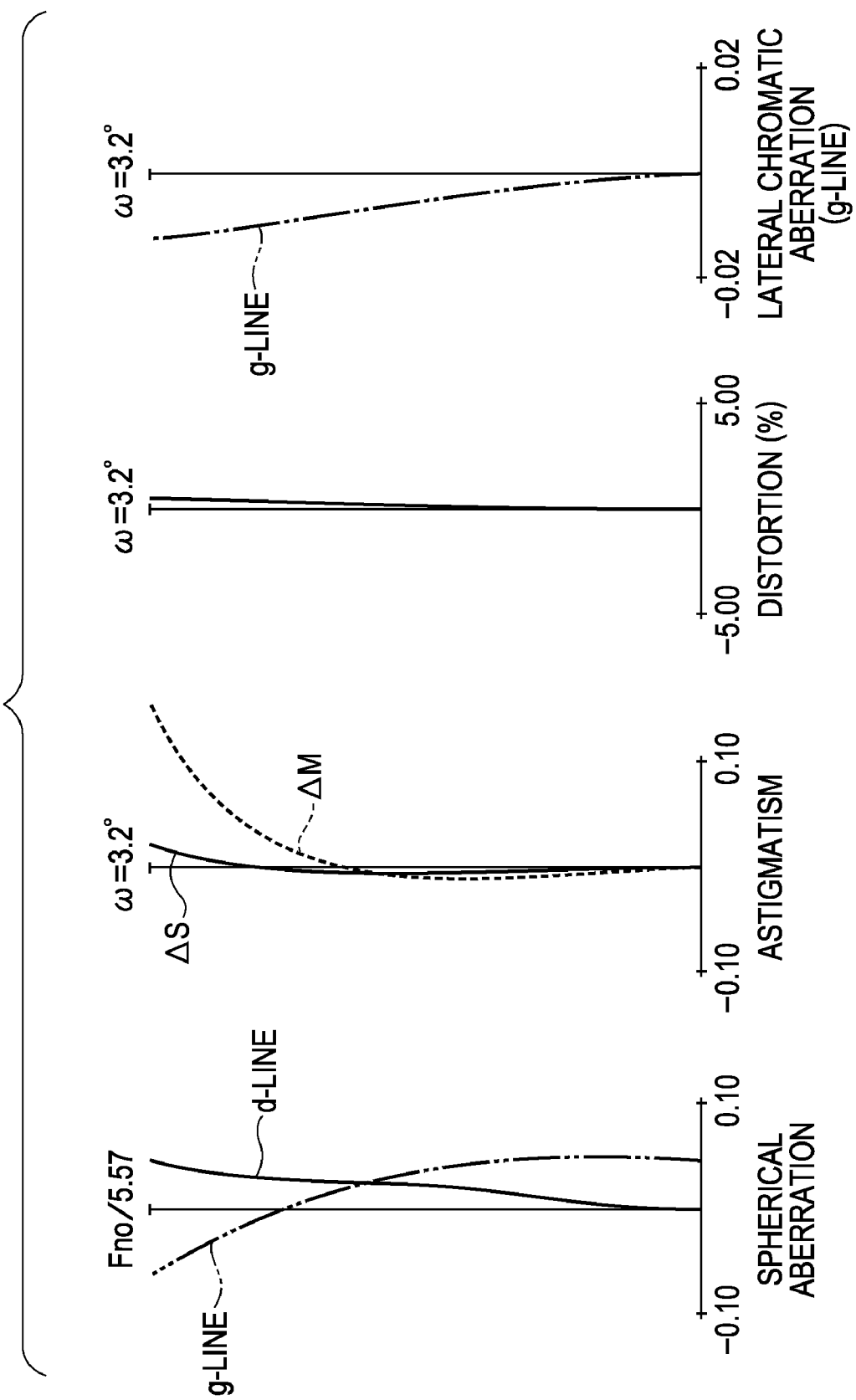
FIG. 8 is a diagram showing aberrations of the zoom lens system of the second embodiment corresponding to Numerical Example 2 at a telephoto end.

FIG. 5 is a sectional view of a zoom lens system according to the second embodiment of the present invention at a wide-angle end. FIGS. 6 to 8 are diagrams showing aberrations of the zoom lens system according to the second embodiment at the wide-angle end, at an intermediate zoom position, and at a telephoto end, respectively.

Figure 9:
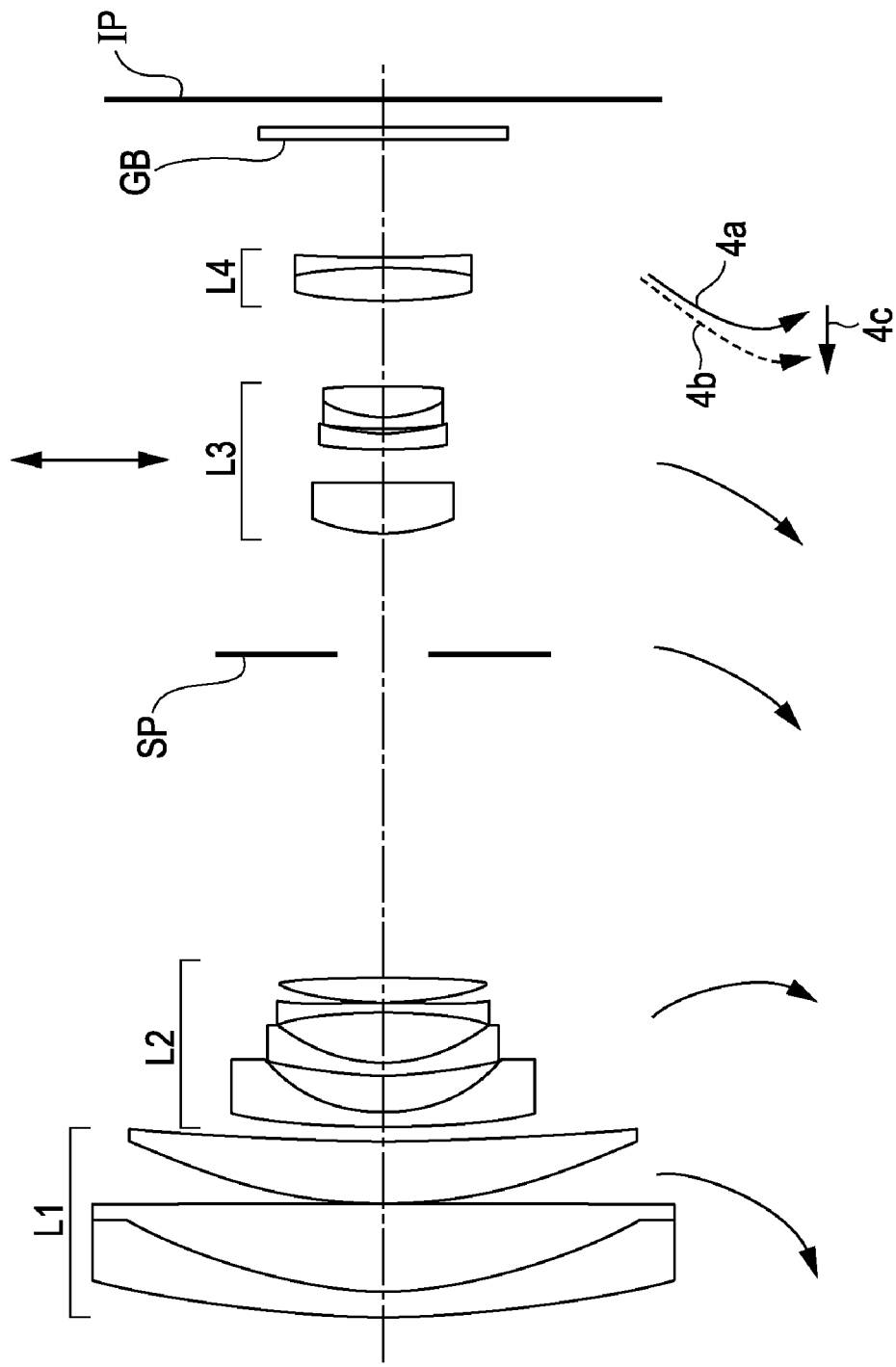
FIG. 9 is a sectional view of a zoom lens system according to a third embodiment of the present invention at a wide-angle end.
Figure 10:
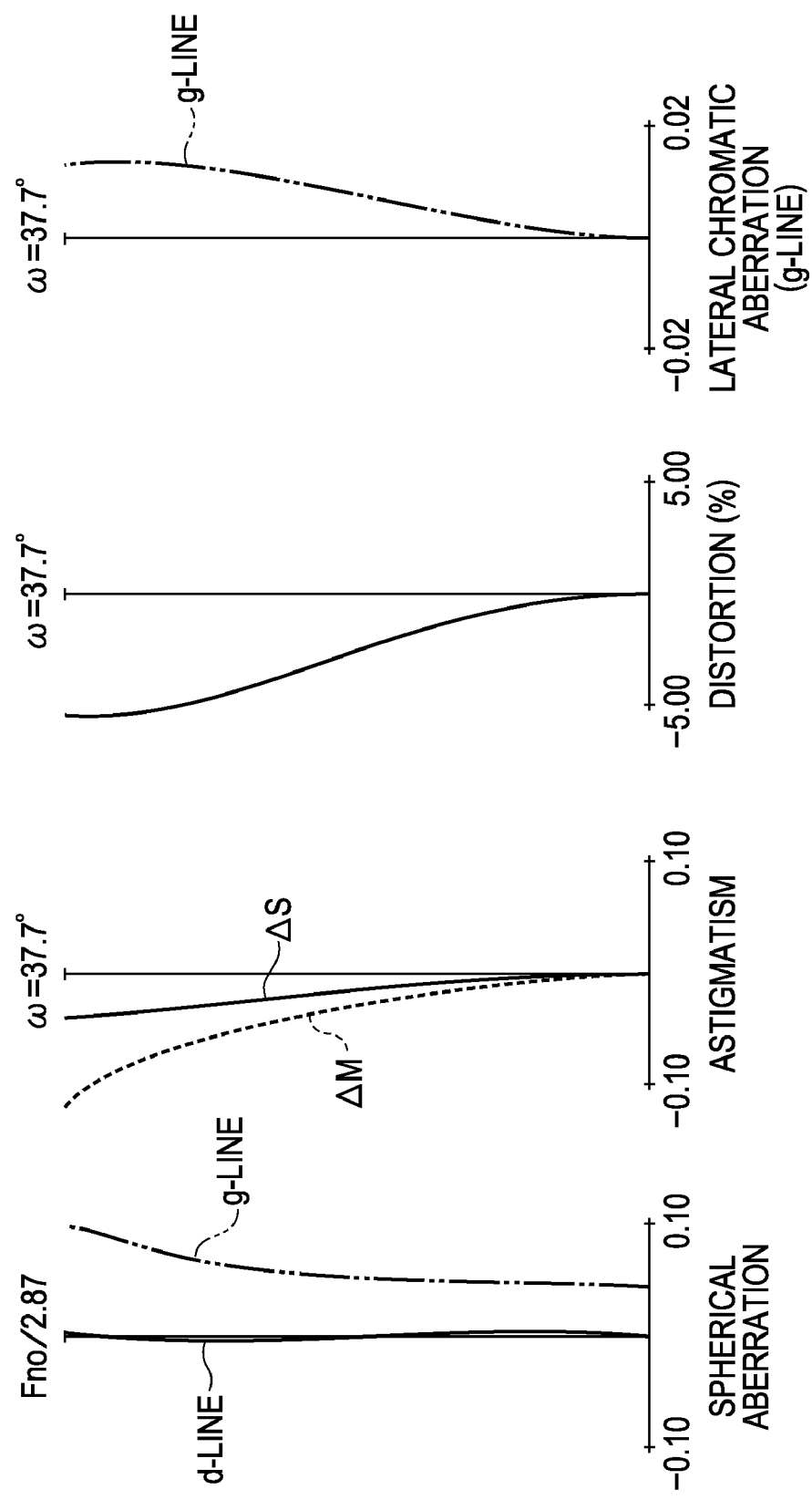
FIG. 10 is a diagram showing aberrations of the zoom lens system of the third embodiment corresponding to Numerical Example 3 at the wide-angle end.
Figure 11:
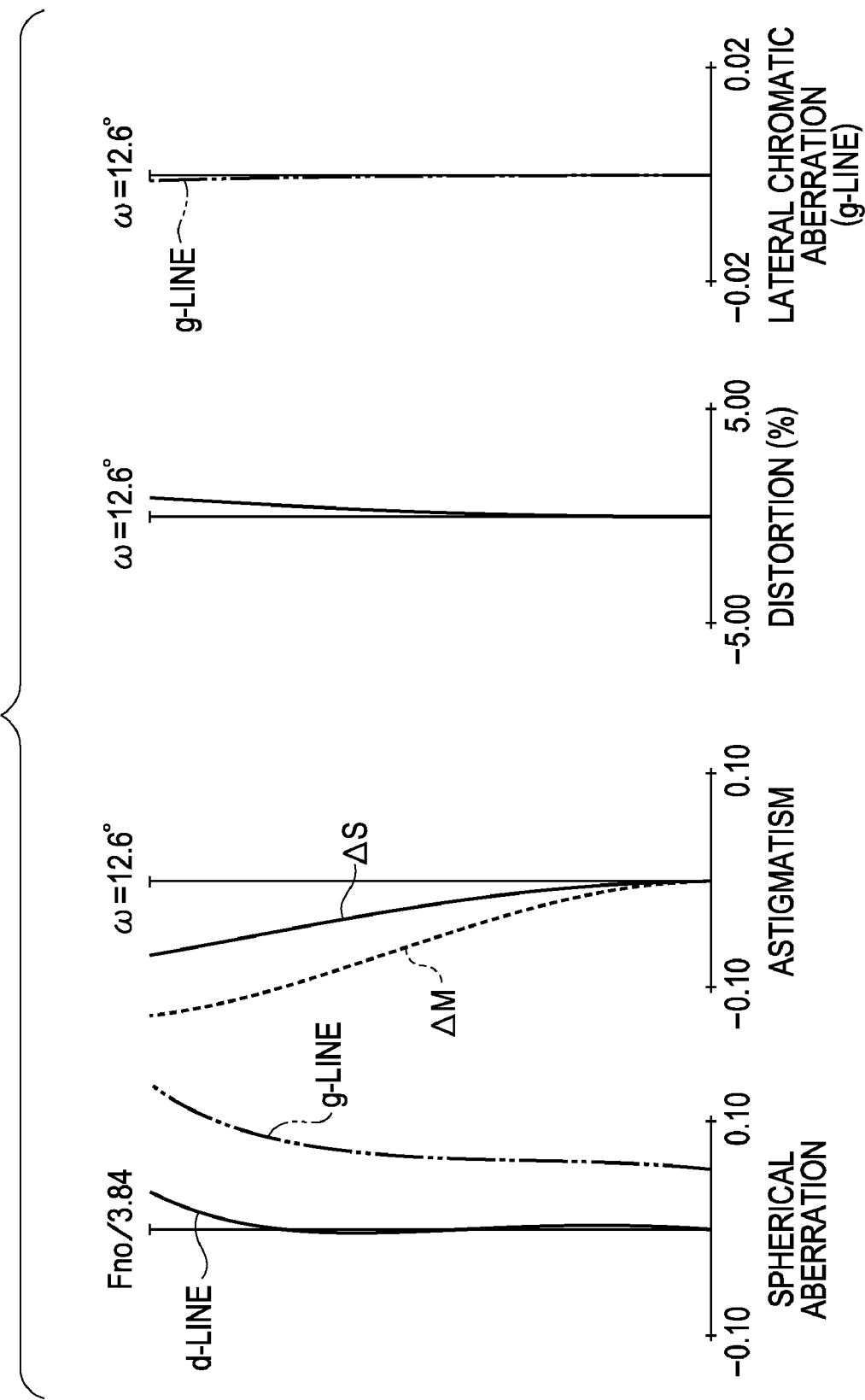
FIG. 11 is a diagram showing aberrations of the zoom lens system of the third embodiment corresponding to Numerical Example 3 at an intermediate zoom position.
Figure 12:
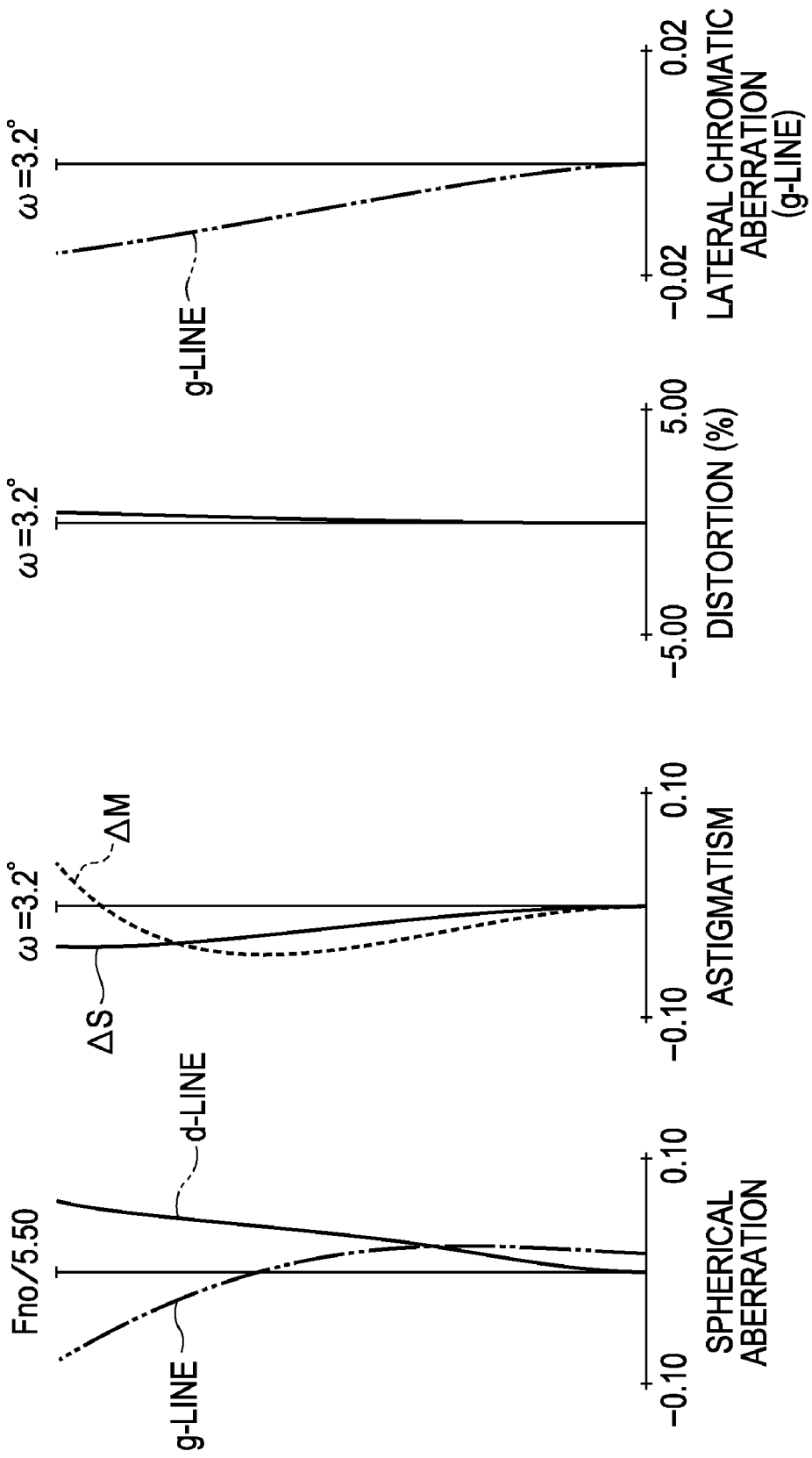
FIG. 12 is a diagram showing aberrations of the zoom lens system of the third embodiment corresponding to Numerical Example 3 at a telephoto end.

FIG. 9 is a sectional view of a zoom lens system according to the third embodiment of the present invention at a wide-angle end. FIGS. 10 to 12 are diagrams showing aberrations of the zoom lens system according to the third embodiment at the wide-angle end, at an intermediate zoom position, and at a telephoto end, respectively.

Figure 13:
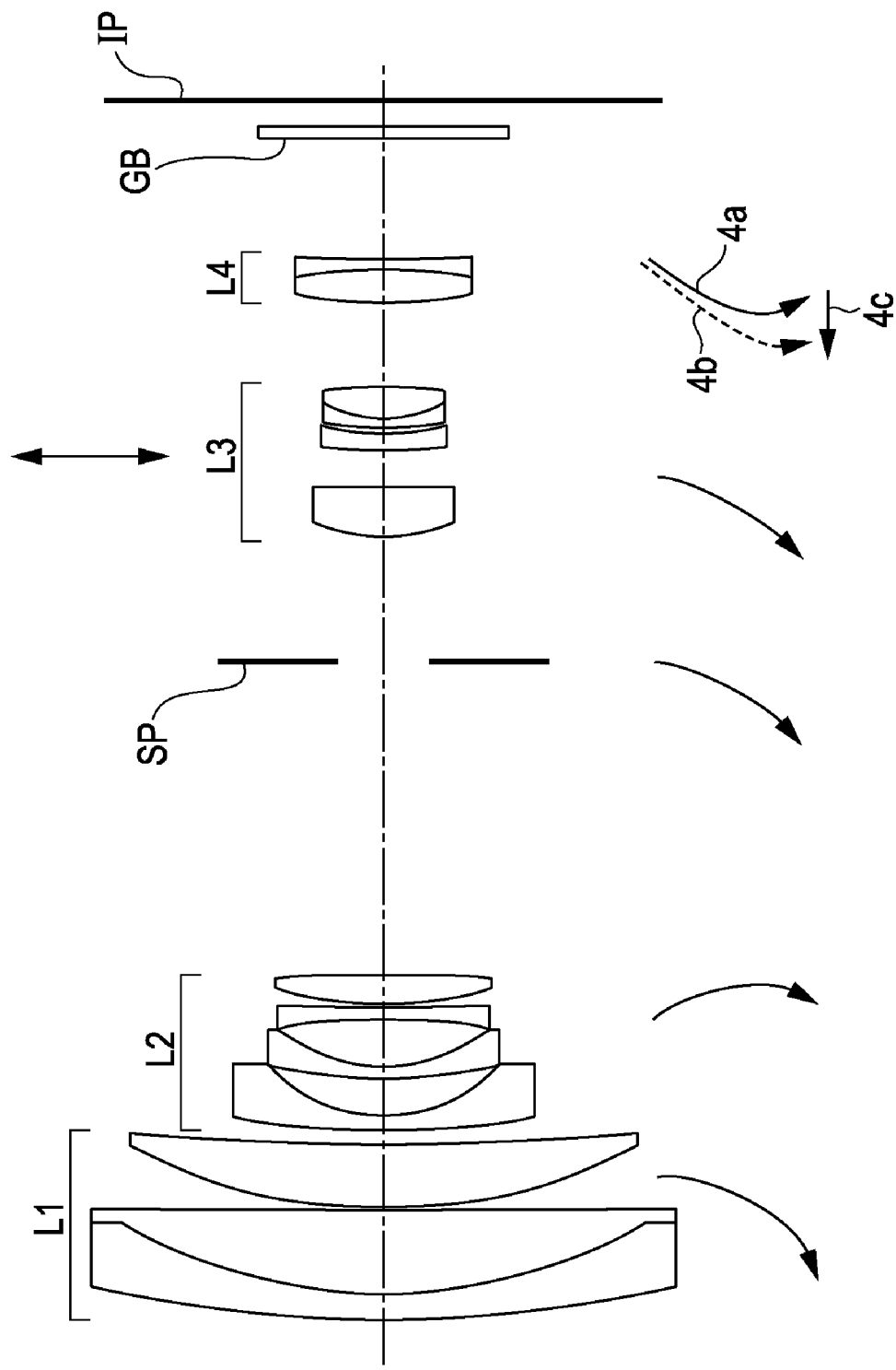
FIG. 13 is a sectional view of a zoom lens system according to a fourth embodiment of the present invention at a wide-angle end.
Figure 14:
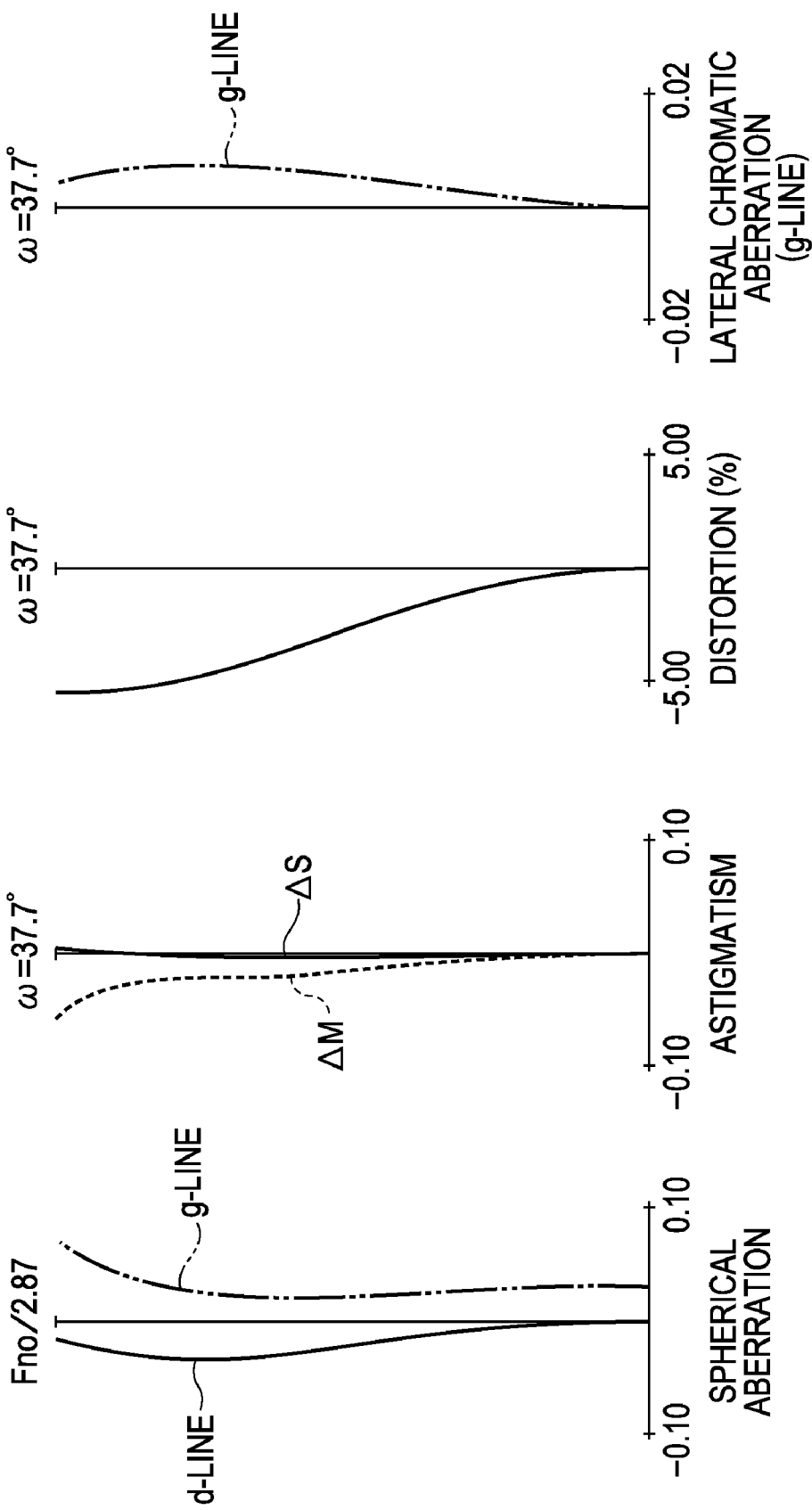
FIG. 14 is a diagram showing aberrations of the zoom lens system of the fourth embodiment corresponding to Numerical Example 4 at the wide-angle end.
Figure 15:
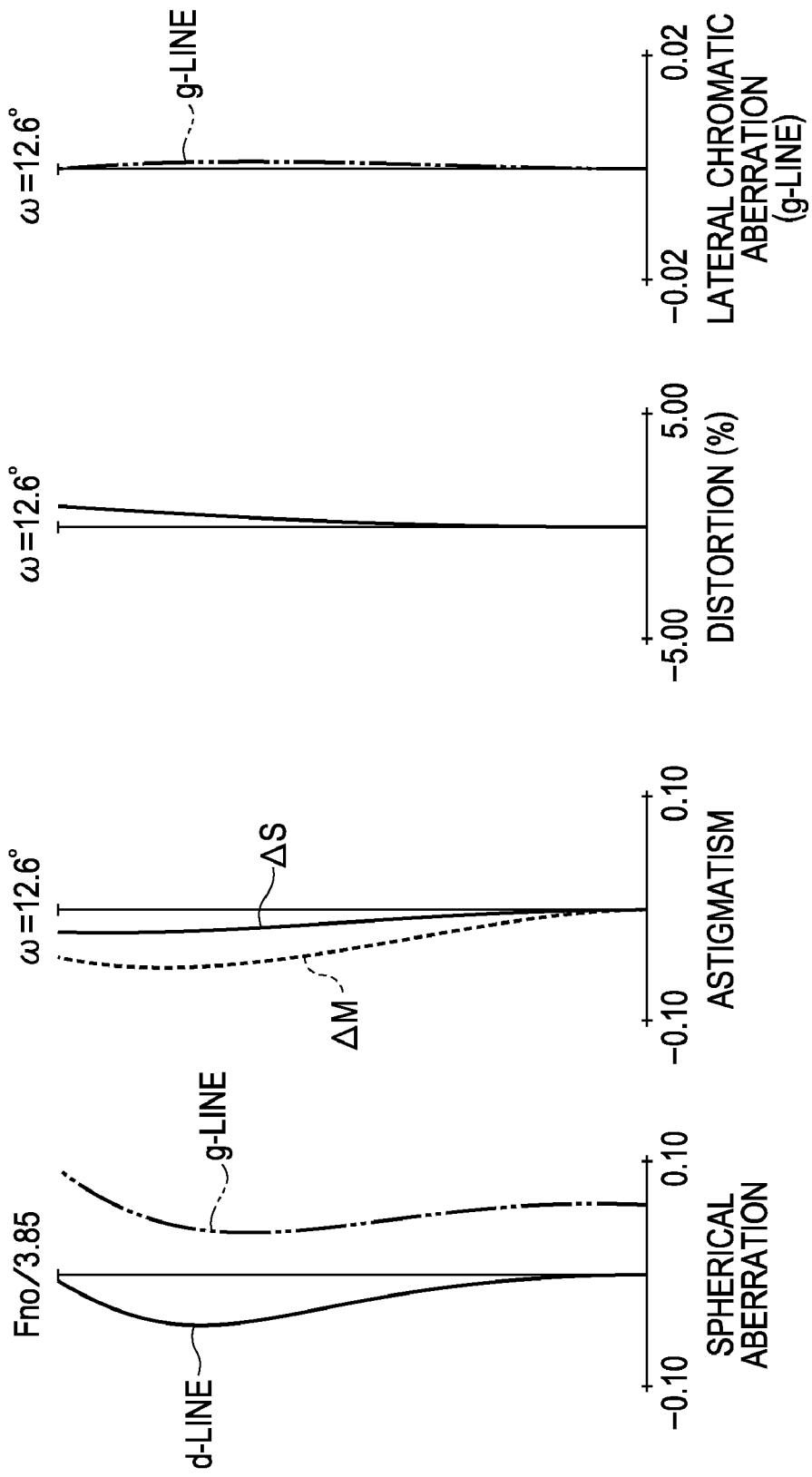
FIG. 15 is a diagram showing aberrations of the zoom lens system of the fourth embodiment corresponding to Numerical Example 4 at an intermediate zoom position.
Figure 16:
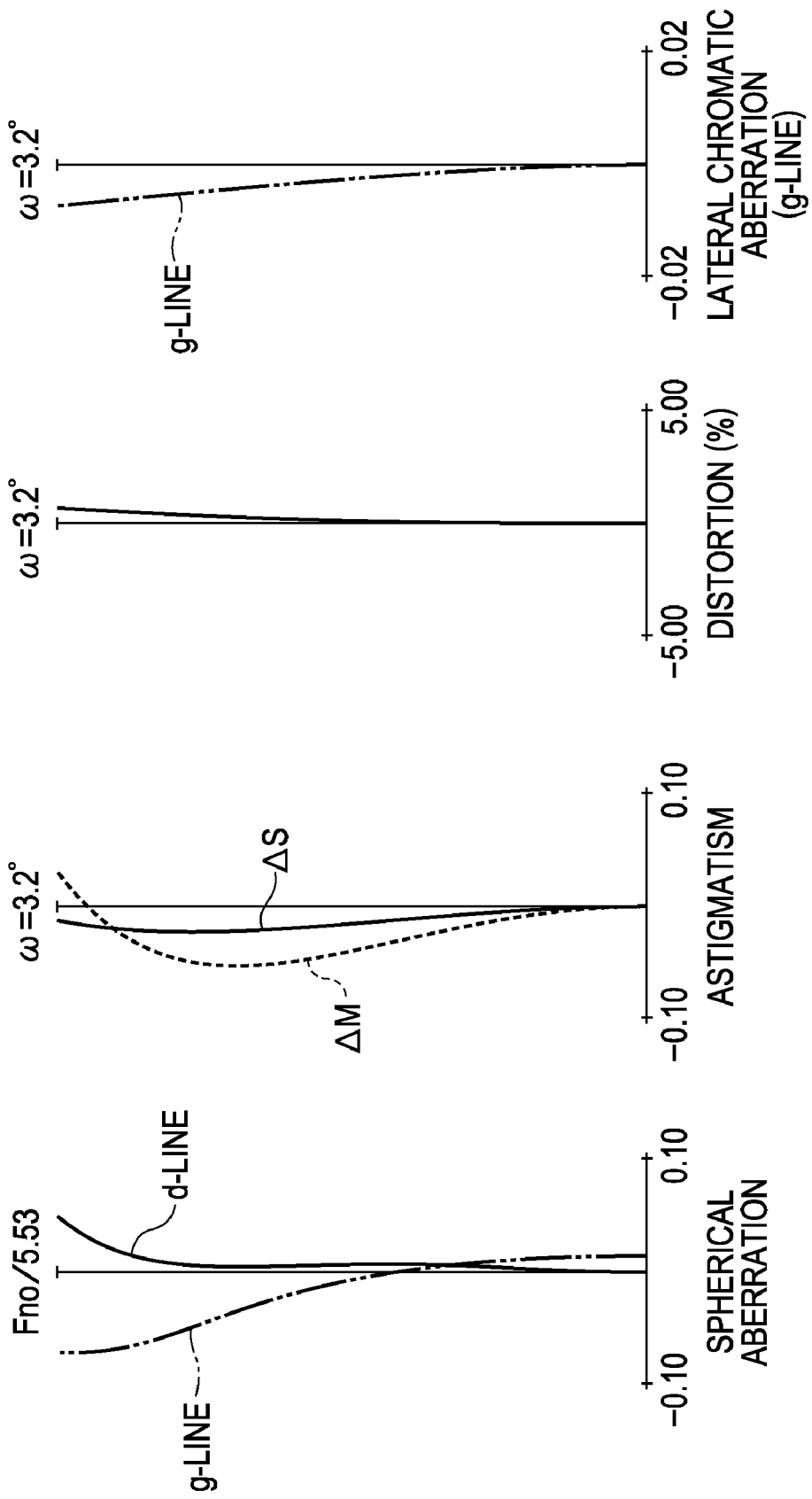
FIG. 16 is a diagram showing aberrations of the zoom lens system of the fourth embodiment corresponding to Numerical Example 4 at a telephoto end.

FIG. 13 is a sectional view of a zoom lens system according to the fourth embodiment of the present invention at a wide-angle end. FIGS. 14 to 16 are diagrams showing aberrations of the zoom lens system according to the fourth embodiment at the wide-angle end, at an intermediate zoom position, and at a telephoto end, respectively.

Figure 17:
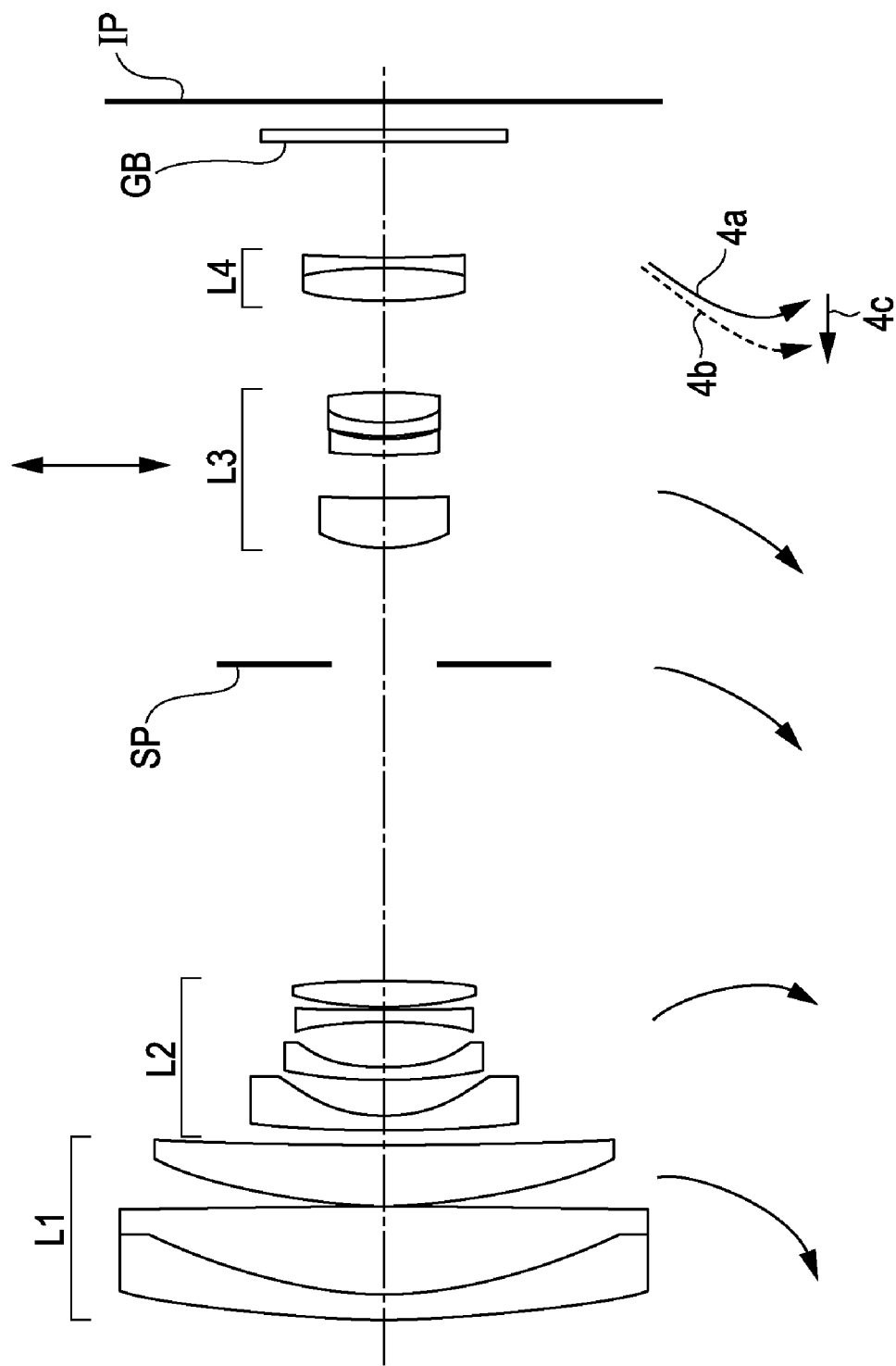
FIG. 17 is a sectional view of a zoom lens system according to a fifth embodiment of the present invention at a wide-angle end.
Figure 18:
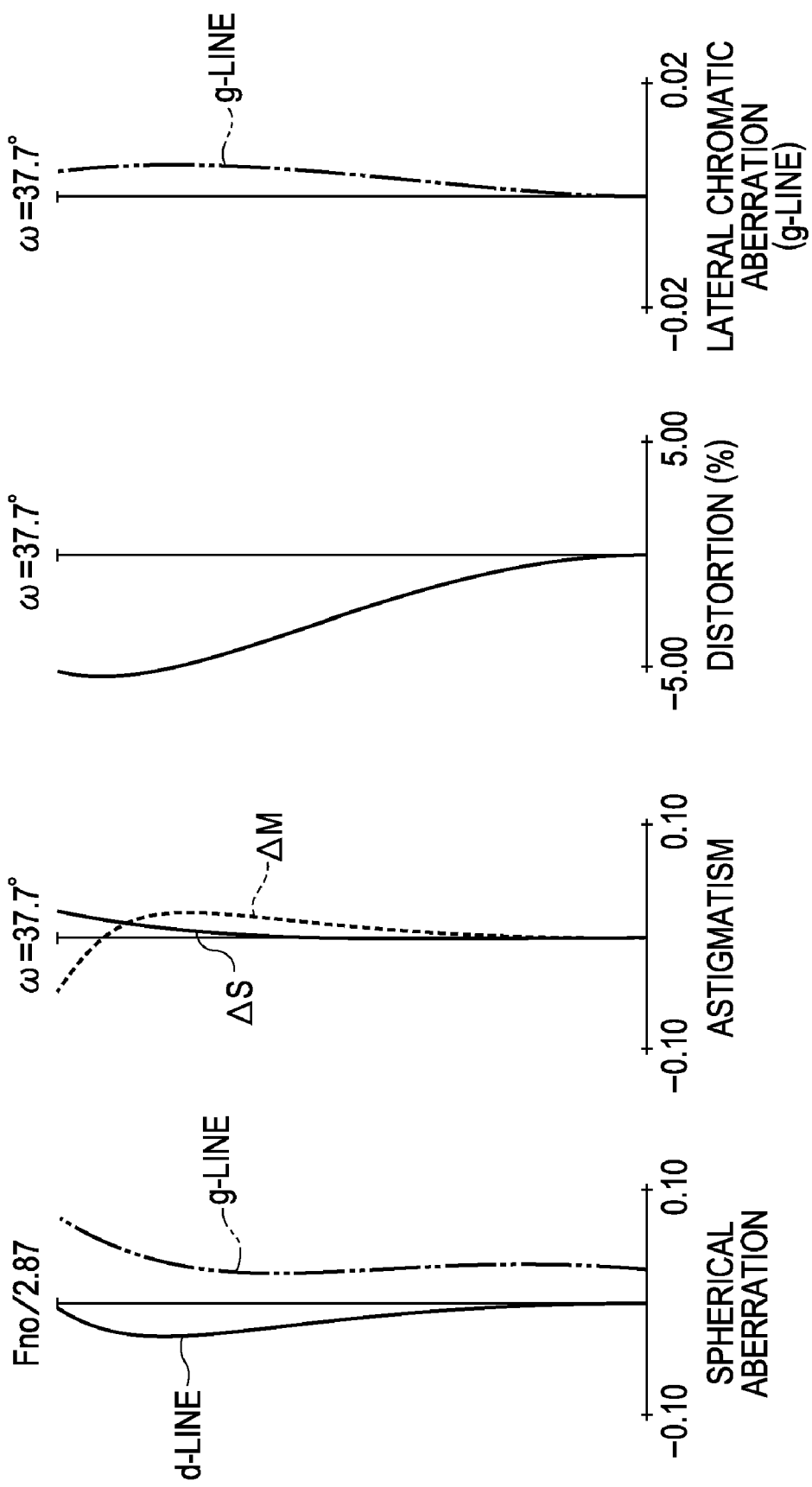
FIG. 18 is a diagram showing aberrations of the zoom lens system of the fifth embodiment corresponding to Numerical Example 5 at the wide-angle end.
Figure 19:
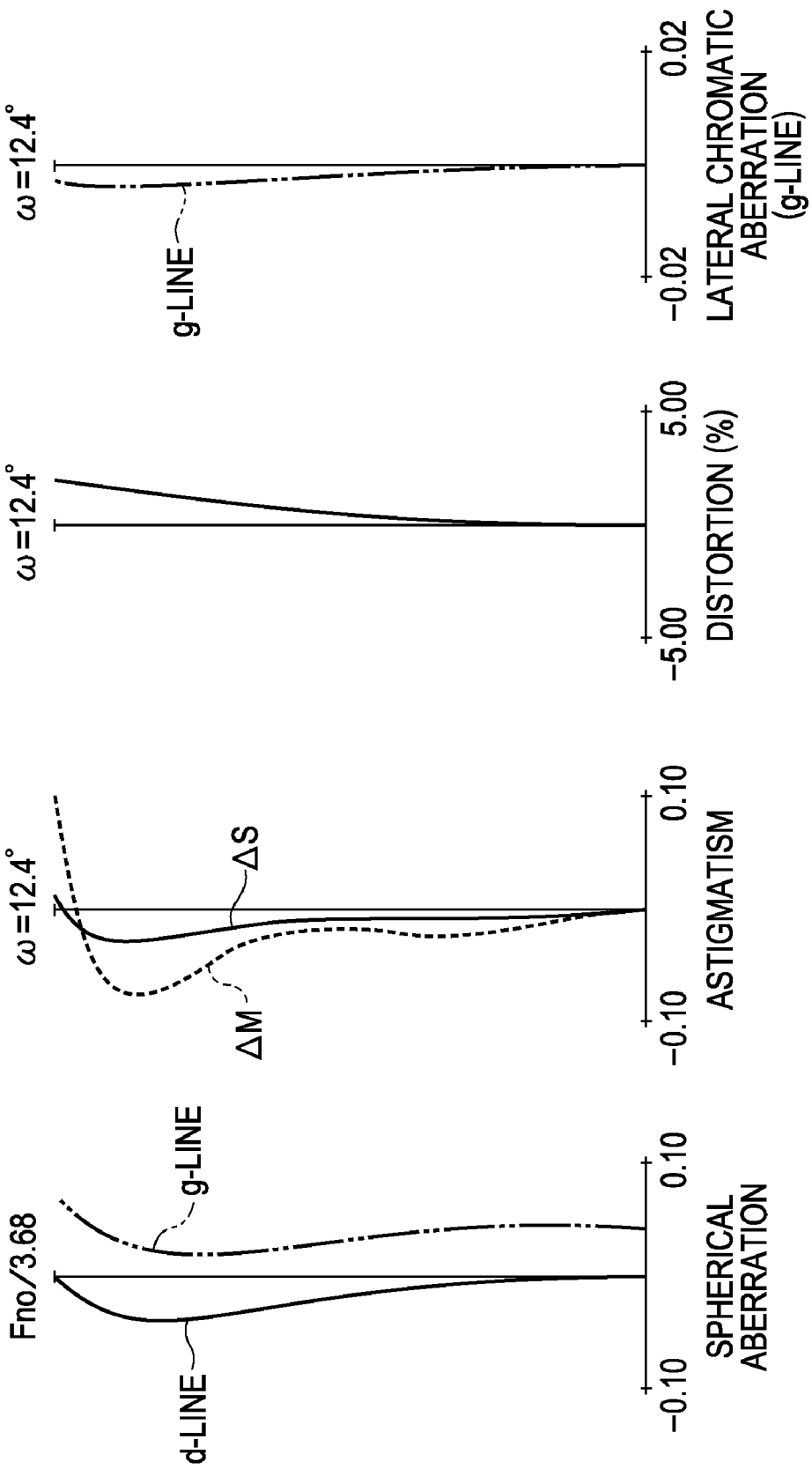
FIG. 19 is a diagram showing aberrations of the zoom lens system of the fifth embodiment corresponding to Numerical Example 5 at an intermediate zoom position.
Figure 20:
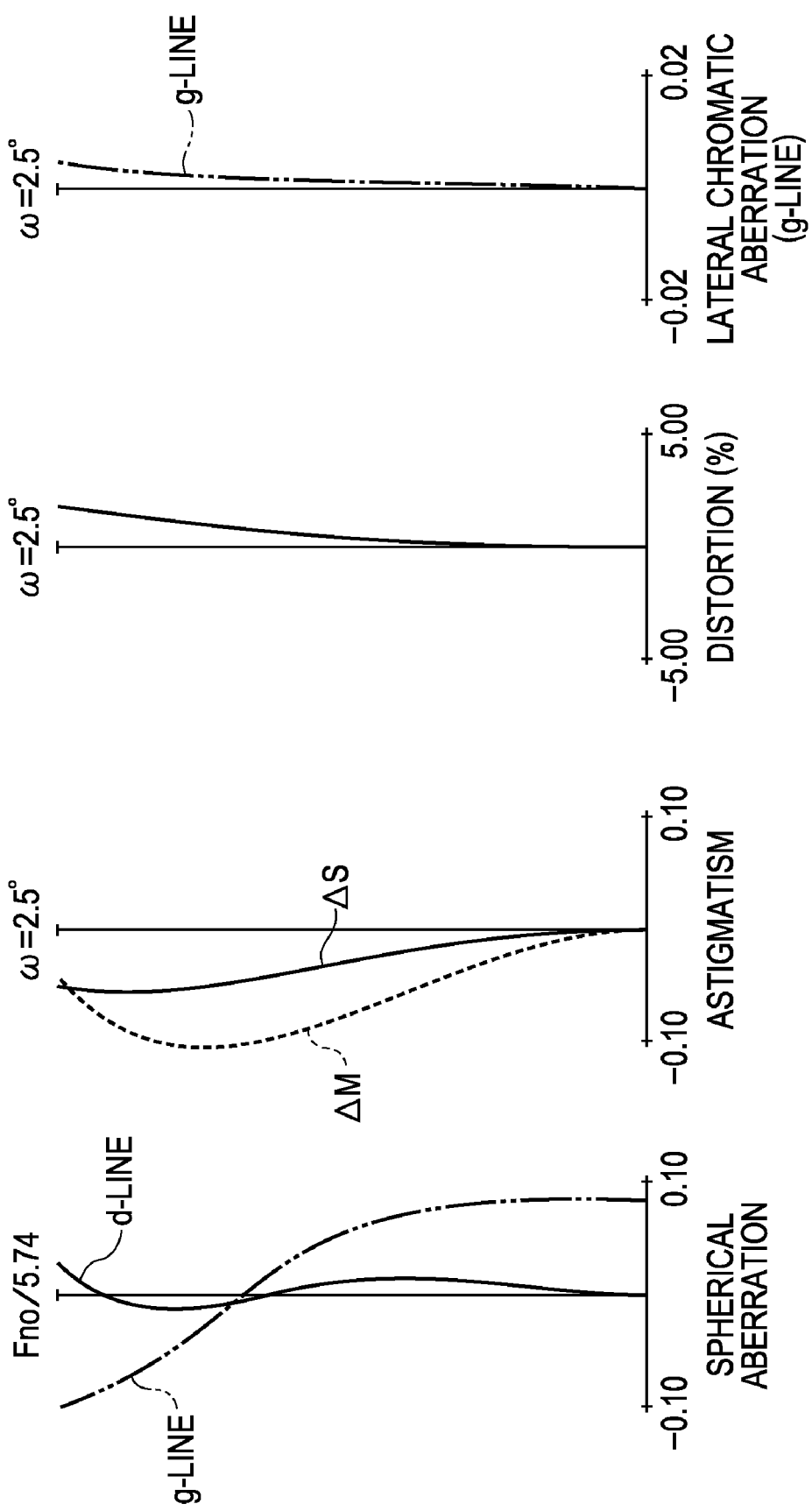
FIG. 20 is a diagram showing aberrations of the zoom lens system of the fifth embodiment corresponding to Numerical Example 5 at a telephoto end.

FIG. 17 is a sectional view of a zoom lens system according to the fifth embodiment of the present invention at a wide-angle end. FIGS. 18 to 20 are diagrams showing aberrations of the zoom lens system according to the fifth embodiment at the wide-angle end, at an intermediate zoom position, and at a telephoto end, respectively.

Figure 21:
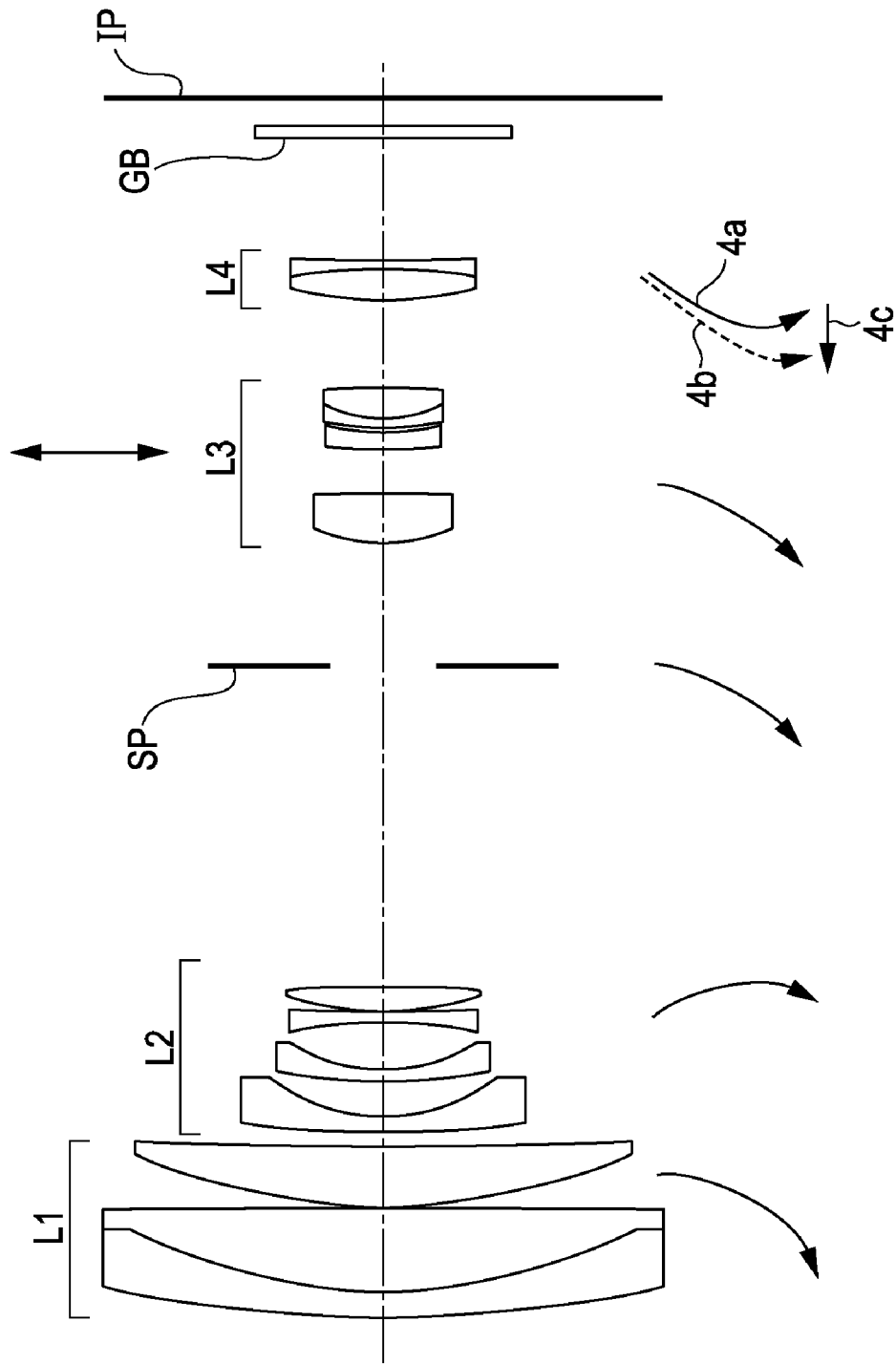
FIG. 21 is a sectional view of a zoom lens system according to a sixth embodiment of the present invention at a wide-angle end.
Figure 22:
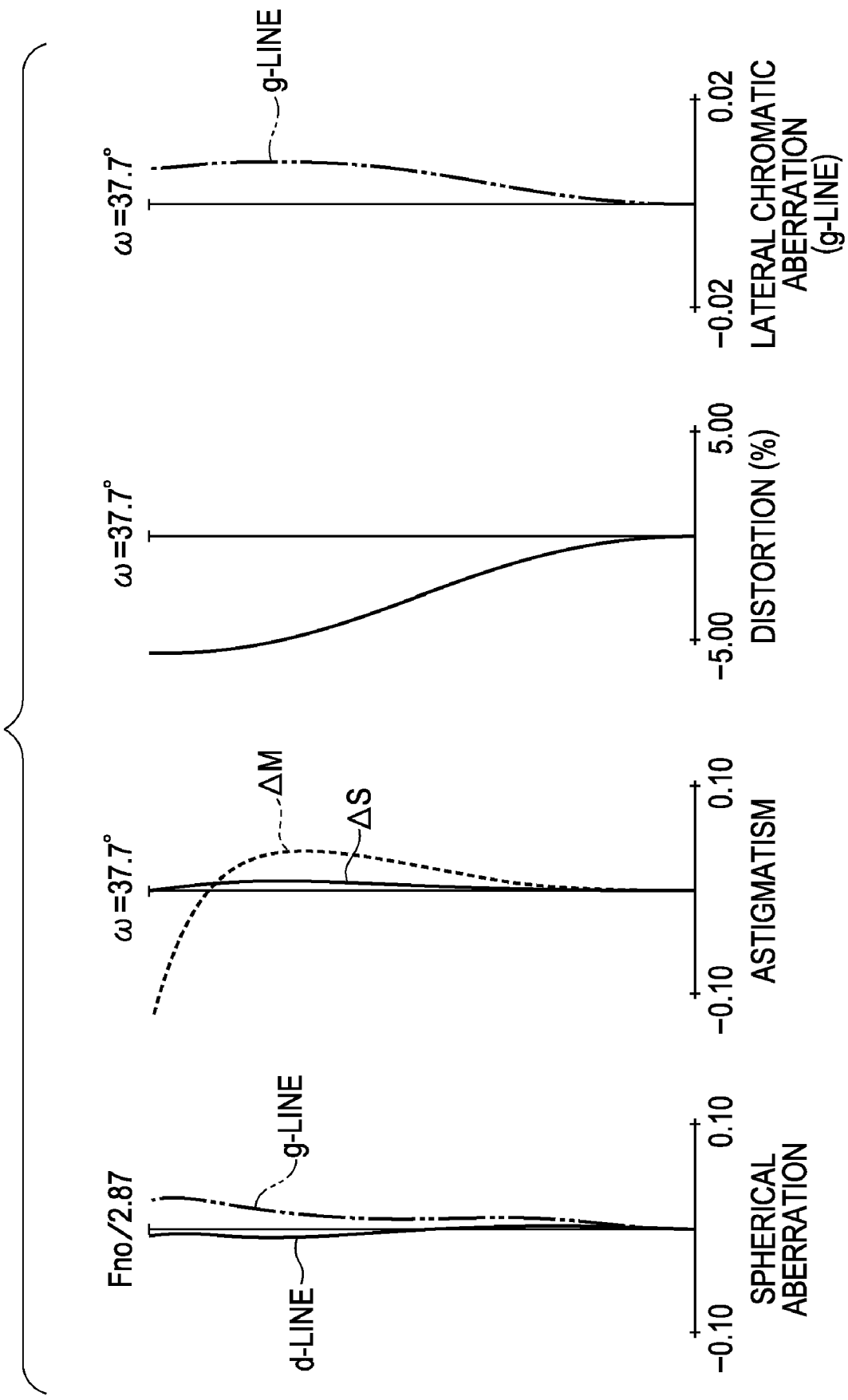
FIG. 22 is a diagram showing aberrations of the zoom lens system of the sixth embodiment corresponding to Numerical Example 6 at the wide-angle end.
Figure 23:
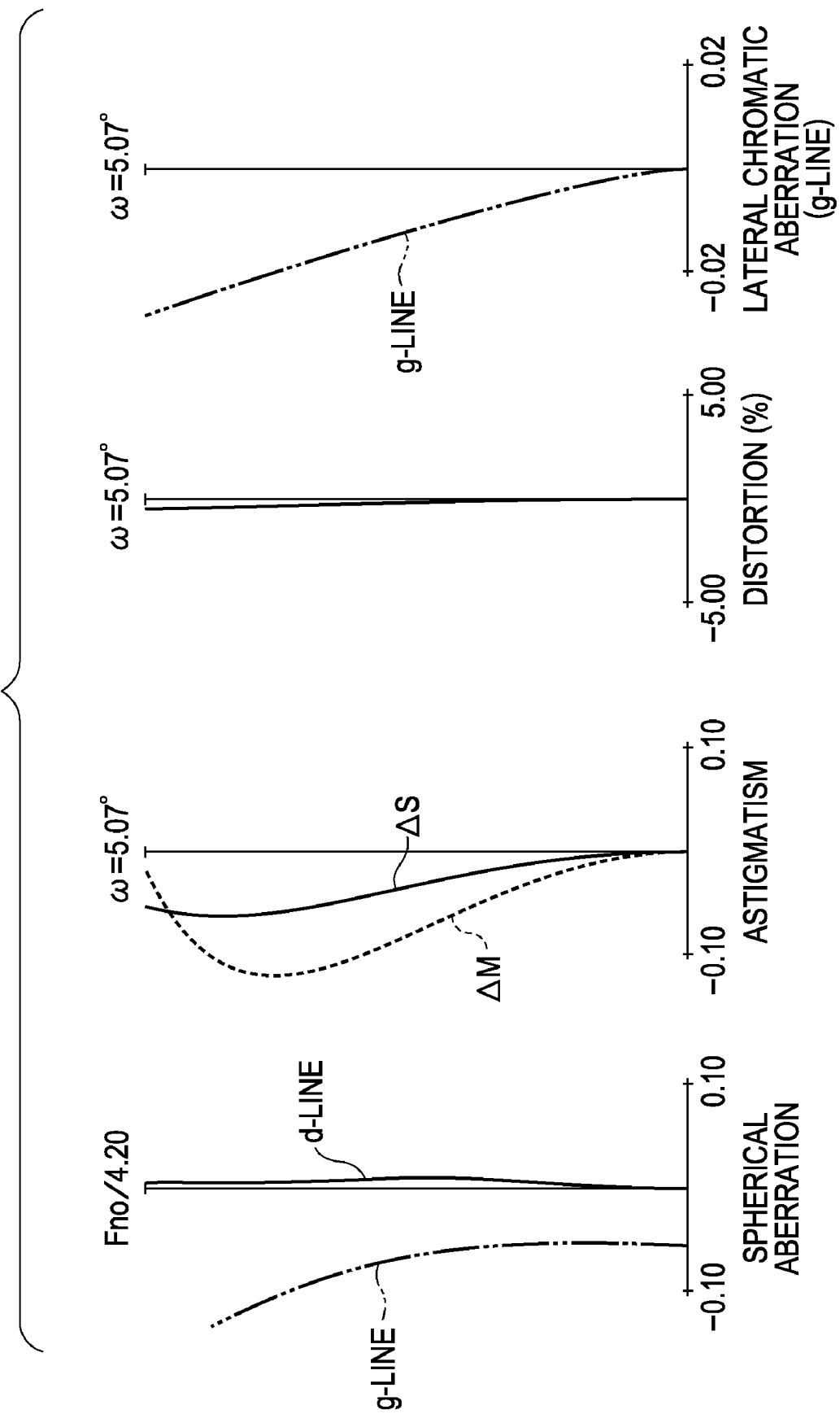
FIG. 23 is a diagram showing aberrations of the zoom lens system of the sixth embodiment corresponding to Numerical Example 6 at an intermediate zoom position.
Figure 24:
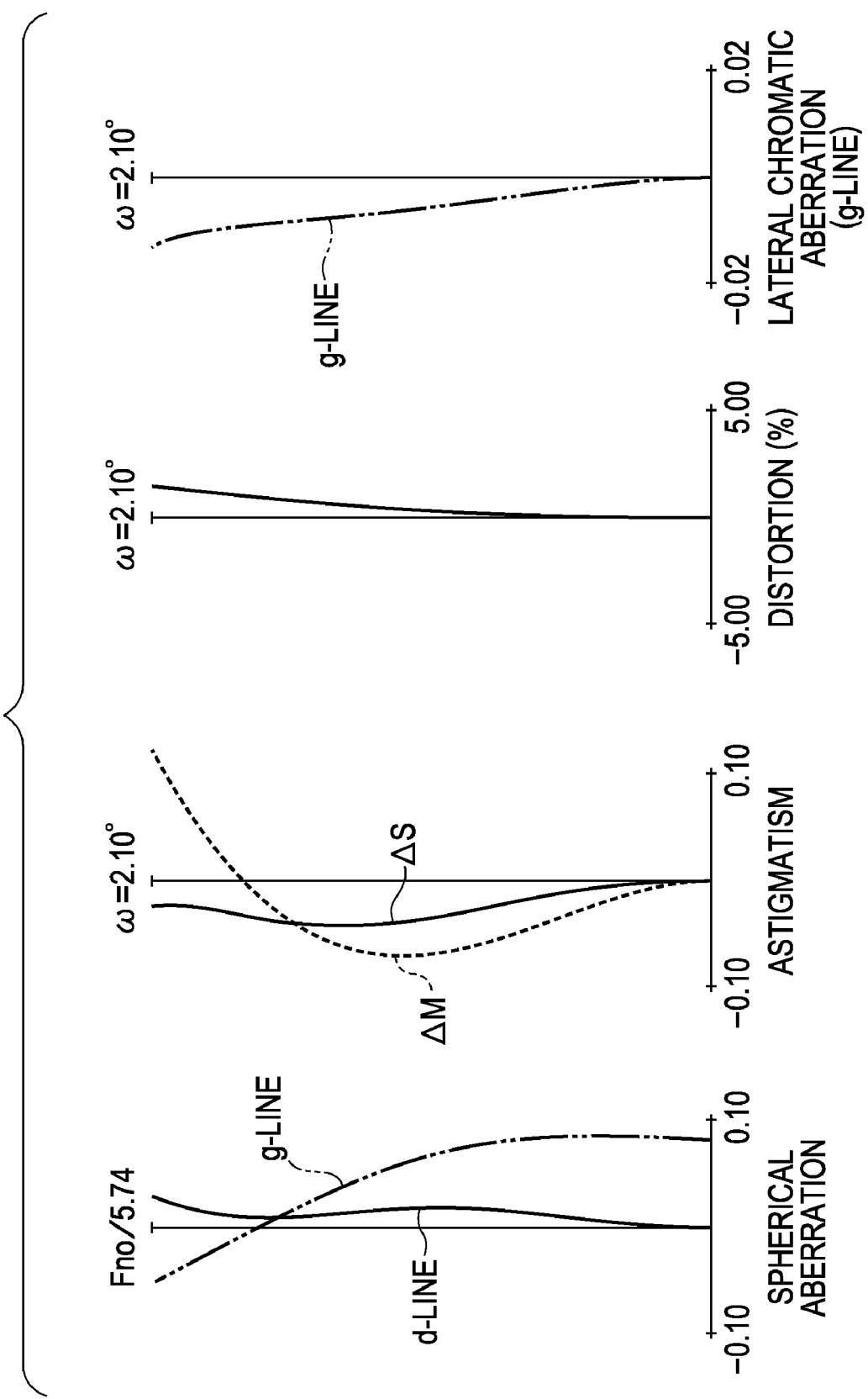
FIG. 24 is a diagram showing aberrations of the zoom lens system of the sixth embodiment corresponding to Numerical Example 6 at a telephoto end.

FIG. 21 is a sectional view of a zoom lens system according to the sixth embodiment of the present invention at a wide-angle end. FIGS. 22 to 24 are diagrams showing aberrations of the zoom lens system according to the sixth embodiment at the wide-angle end, at an intermediate zoom position, and at a telephoto end, respectively.

Figure 25:
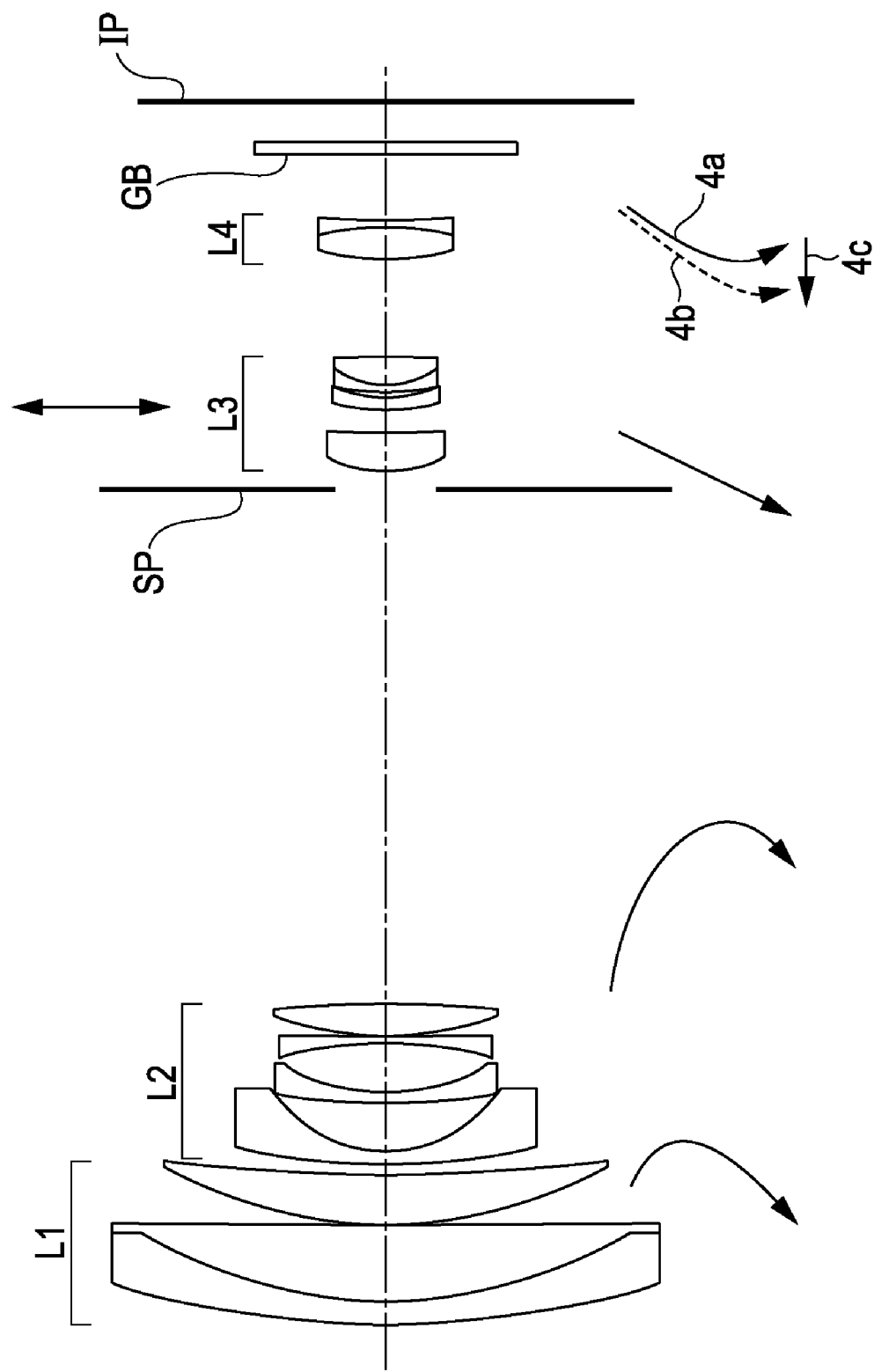
FIG. 25 is a sectional view of a zoom lens system according to a seventh embodiment of the present invention at a wide-angle end.
Figure 26:
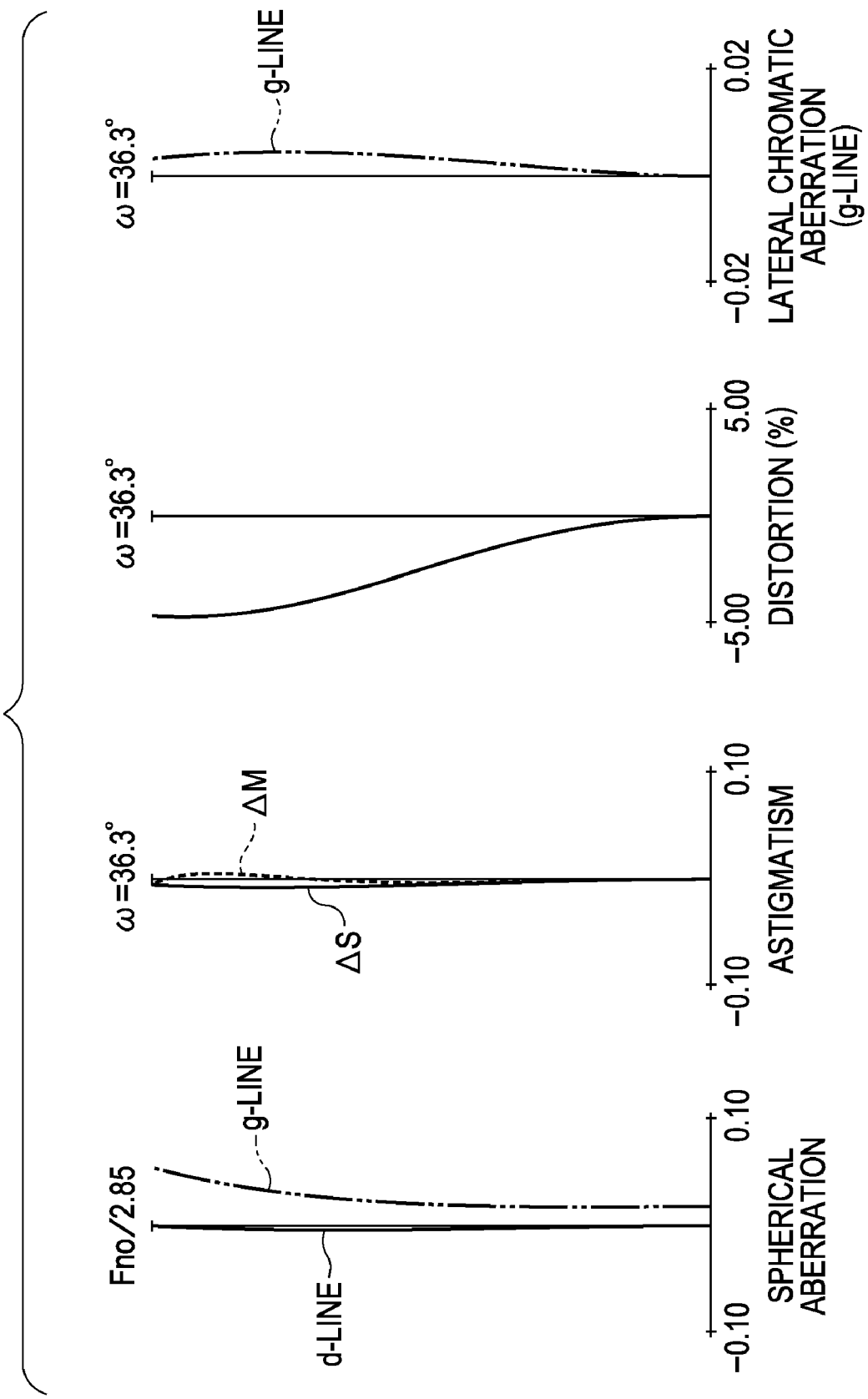
FIG. 26 is a diagram showing aberrations of the zoom lens system of the seventh embodiment corresponding to Numerical Example 7 at the wide-angle end.
Figure 27:
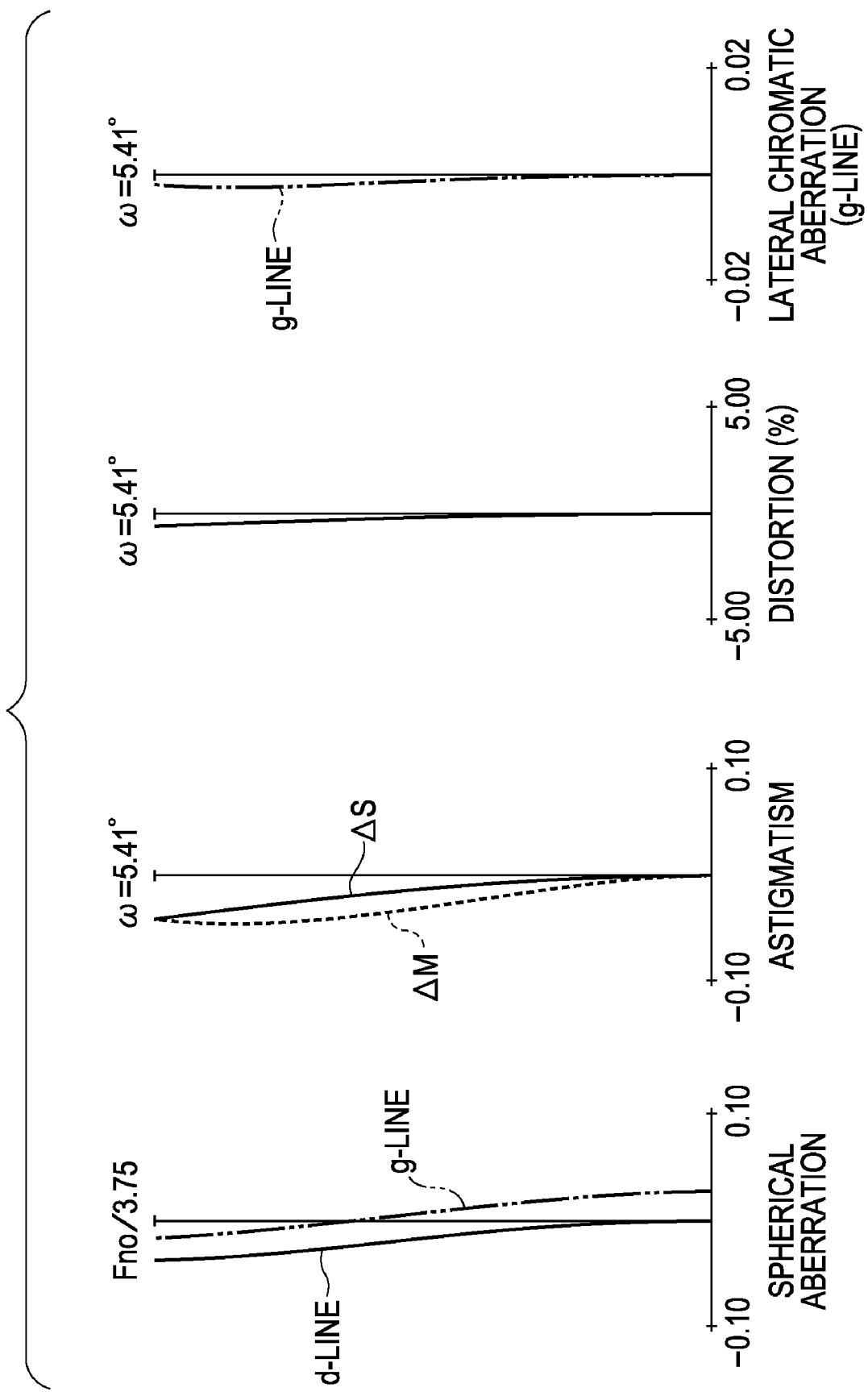
FIG. 27 is a diagram showing aberrations of the zoom lens system of the seventh embodiment corresponding to Numerical Example 7 at an intermediate zoom position.
Figure 28:
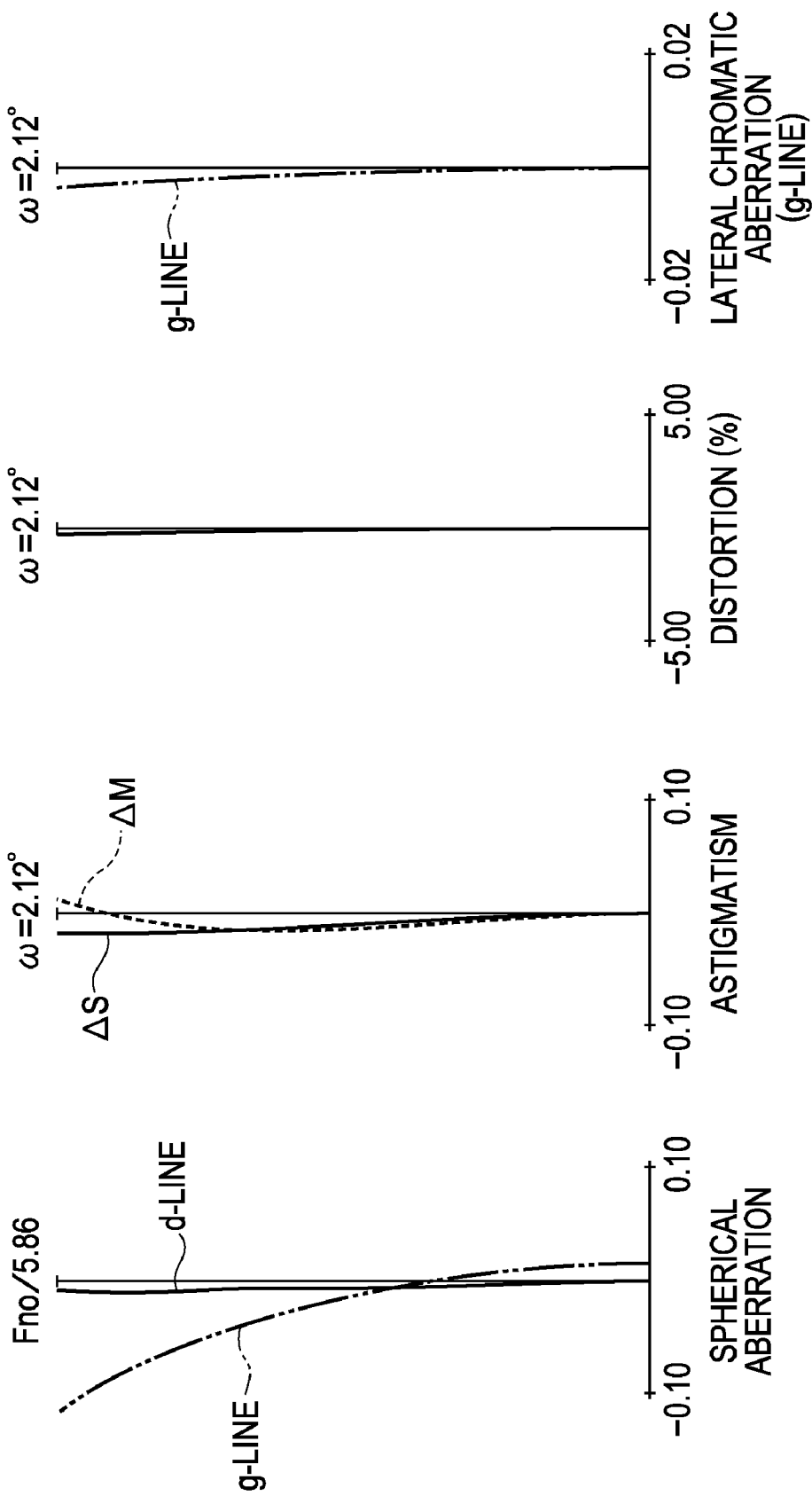
FIG. 28 is a diagram showing aberrations of the zoom lens system of the seventh embodiment corresponding to Numerical Example 7 at a telephoto end.

FIG. 25 is a sectional view of a zoom lens system according to the seventh embodiment of the present invention at a wide-angle end. FIGS. 26 to 28 are diagrams showing aberrations of the zoom lens system according to the seventh embodiment at the wide-angle end, at an intermediate zoom position, and at a telephoto end, respectively.

Figure 29:
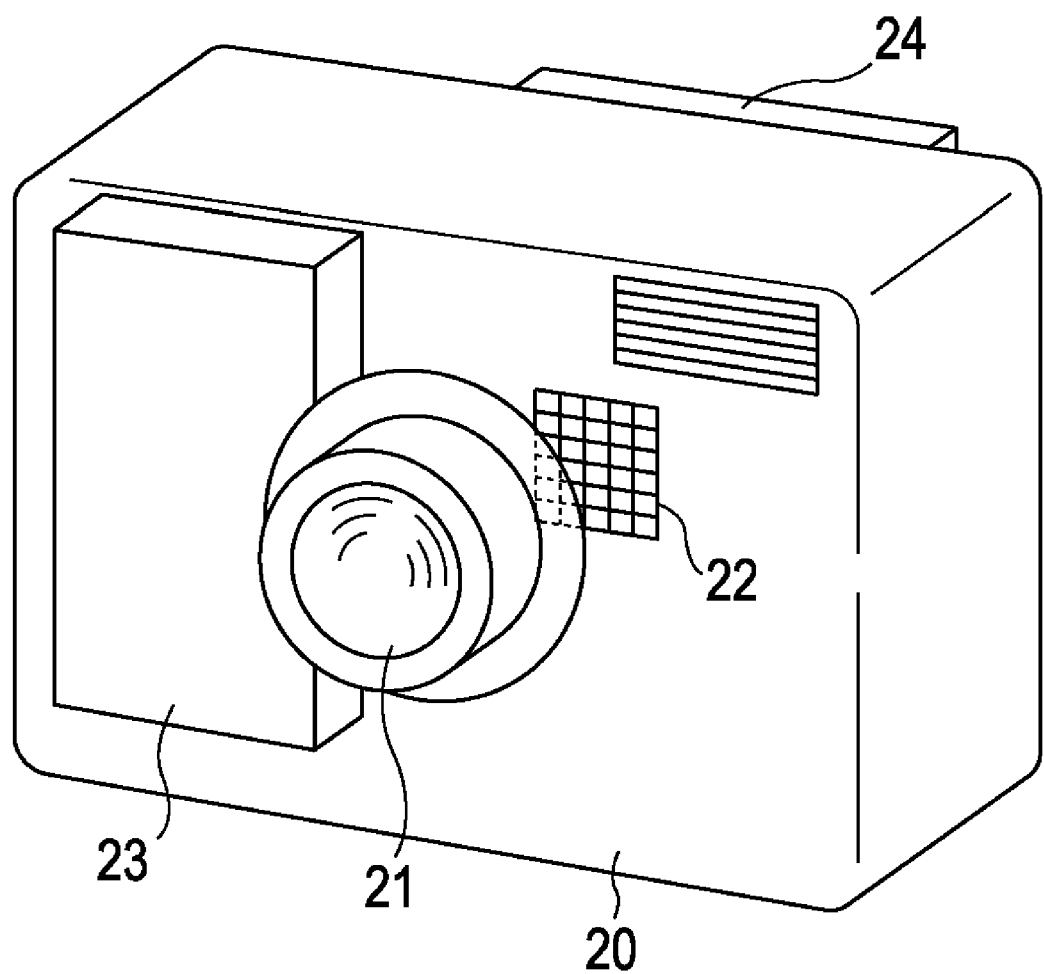
FIG. 29 schematically shows an image pickup apparatus according to an eighth embodiment of the present invention.

FIG. 29 schematically shows relevant parts of a camera (an image pickup apparatus) that includes the zoom lens system according to any of the embodiments of the present invention. The zoom lens systems according to the first to seventh embodiments are image taking lens systems included in image pickup apparatuses such as video cameras, digital still cameras, and silver-halide-film cameras.

In the sectional view of each zoom lens system, an object resides on the left (front) side, and an image is formed on the right (rear) side. Further, in the sectional view, i denotes the order of the lens unit counted from the object side. For example, Li denotes the i-th lens unit.

In the sectional view, the zoom lens system includes a first lens unit L1 having a positive optical power (refractive power, i.e., the reciprocal of a focal length), a second lens unit L2 having a negative optical power, a third lens unit L3 having a positive optical power, and a fourth lens unit L4 having a positive optical power.

The zoom lens system also includes an aperture stop SP, which is disposed on the object side with respect to the third lens unit L3, and an optical block GB, which is a component such as an optical filter, a face plate, a quartz low-pass filter, or an infrared-cut filter.

An image plane IP functions as a photosensitive plane, which is an equivalent of the image pickup plane of a solid-state image pickup device (photoelectric conversion element) such as a charge-coupled-device (CCD) sensor or a complementary-metal-oxide-semiconductor (CMOS) sensor when the zoom lens system is used as an image taking optical system of a video camera or a digital still camera, or the film surface when the zoom lens system is used in a silver-halide-film camera.

In each aberration diagram, d and g denote the d-line and the g-line, respectively, and $\Delta M$ and $\Delta S$ denote the meridional image plane and the sagittal image plane, respectively. The lateral chromatic aberration is shown for the g-line. Further, $\omega$ denotes the half angle of view, and Fno denotes the f-number.

In each of the embodiments described below, the wide-angle end and the telephoto end are zoom positions at extreme ends of a range in which magnification-changing lens units can mechanically move along the optical axis.

In each embodiment, the lens units and the aperture stop SP move as indicated by respective arrows during zooming from the wide-angle end to the telephoto end.

Specifically, during zooming from the wide-angle end to the telephoto end, the first lens unit L1 moves toward the image side first and then toward the object side. During zooming from the wide-angle end to the telephoto end, the first lens unit L1 moves in such a manner as to be positioned closer to the object side at the telephoto end than at the wide-angle end.

The second lens unit L2 moves along a locus convex toward the image side. The third lens unit L3 moves toward the object side. The fourth lens unit L4 moves along a locus convex toward the object side. The aperture stop SP moves independently from all of the lens units or together with the third lens unit L3 toward the object side.

During zooming from the wide-angle end to the telephoto end, the first lens unit L1 and the third lens unit L3 move in such a manner as to be positioned closer to the object side at the telephoto end than at the wide-angle end. Thus, the total length of the zoom lens system at the wide-angle end can be maintained to be small while a high zoom ratio can be realized.

Particularly, in each embodiment, by moving the third lens unit L3 toward the object side during zooming, magnification-changing operation is shared between the third lens unit L3 and the fourth lens unit L4. Further, by moving the first lens unit L1 having a positive optical power toward the object side, the second lens unit L2 can be made to produce a significant magnification-changing effect. Thus, a high zoom ratio can be realized without largely increasing the optical powers of the first lens unit L1 and the second lens unit L2.

The zoom lens system in each embodiment employs a rear-focusing method in which focusing is performed by moving the fourth lens unit L4 along the optical axis.

At the telephoto end, to focus on a near object from focusing on an object at infinity, the fourth lens unit L4 is moved forward as indicated by an arrow 4c shown in each sectional view. A solid curve 4a and a dotted curve 4b shown for the fourth lens unit L4 are loci along which the fourth lens unit L4 moves to correct variations in the image plane occurring during zooming from the wide-angle end to the telephoto end.

The solid curve 4a indicates the case where the focus is on an object at infinity, and the dotted curve 4b indicates the case where the focus is on a near object.

As described above, by setting the locus of the fourth lens unit L4 to be convex toward the object side, the space between the third lens unit L3 and the fourth lens unit L4 is efficiently utilized, whereby the total length of the zoom lens system can be reduced effectively.

In each embodiment, the fourth lens unit L4, which is of small weight, is moved for the purpose of focusing. This facilitates quick focusing. For example, automatic focus detection can be performed quickly.

In addition, the first lens unit L1, which does not move along the optical axis for the purpose of focusing, may be made to move independently or together with the fourth lens unit L4 according to need of correction of aberration.

In each embodiment, in the event where the entirety of the zoom lens system is shaken, the position of an image to be taken is corrected by shifting the entirety or a part of the third lens unit L3 in a direction in which a component perpendicular to the optical axis is produced. That is, image displacement (positional shift of the image plane) is corrected.

In each embodiment, the aperture stop SP moves independently from the lens units during zooming. Thus, the entrance pupil for wide angles of view is positioned close to the object side, whereby increase in the front lens diameter (the effective diameter of the first lens unit) is suppressed.

In each embodiment, the focal length of the first lens unit L1 is denoted as f1, and the distance between the position of the first lens unit L1 at the wide-angle end and the position of the first lens unit L1 at the telephoto end is denoted as st1.

Further, the focal lengths of the entire system at the wide-angle end and at the telephoto end are denoted as fw and ft, respectively, and the lateral magnifications of the third lens unit L3 at the wide-angle end and at the telephoto end are denoted as $\beta 3W$ and $\beta 3T$, respectively.

Here, the following conditional expressions are satisfied:

[Mathematical Expression 1]

$$0.05 < f1/(st1 \times ft/fw) < 0.2 \qquad (1)$$

$$1.5 < \beta 3T/\beta 3W < 3.6 \qquad (2)$$

Conditional Expression (1) expresses the relationship between the moving distance and the focal length of the first lens unit L1 during zooming.

If the lower limit of Conditional Expression (1) is exceeded, the moving distance of the first lens unit L1 increases. Hence, the total optical length (the distance from the first lens surface to the image plane) at the telephoto end also increases. In addition, the length of a lens barrel needs to be increased in order to obtain a sufficient length for the stroke of the first lens unit L1. Accordingly, the retracted length of the lens barrel also increases. Consequently, it becomes difficult to reduce the total size of the zoom lens system.

In contrast, if the upper limit of Conditional Expression (1) is exceeded, the moving distance of the first lens unit L1 is reduced. This facilitates total size reduction of the zoom lens system. However, in order to produce the magnification-changing effect by using the second lens unit L2, the optical power (refractive power) needs to be increased. Hence, it becomes particularly difficult to suppress variations in field curvature caused by zooming.

Conditional Expression (2) expresses the magnification-changing effect of the third lens unit L3. If the lower limit of Conditional Expression (2) is exceeded, the magnification-changing effect of the third lens unit L3 is weakened. This requires the magnification-changing effect of the second lens unit L2 to be enhanced. Hence, the optical power of the second lens unit L2 needs to be increased.

Accordingly, it becomes difficult to suppress variations in field curvature caused by zooming.

In contrast, if the upper limit of Conditional Expression (2) is exceeded, the magnification-changing effect of the third lens unit L3 is enhanced. Hence, the total optical length can be reduced and the front lens diameter can also be reduced.

However, such an effect is undesirable because spherical aberration at the wide-angle end is observed on the under side and it becomes difficult to obtain a sufficiently long back focus.

In each embodiment, from the viewpoint of aberration correction, more desirable settings of Conditional Expressions (1) and (2) are as follows:

[Mathematical Expression 2]

$$0.06 < f1/(st1 \times ft/fw) < 0.18 \quad (1a)$$

$$1.7 < \beta3T/\beta3W < 3.5 \quad (2a)$$

More desirable settings of Conditional Expressions (1a) and (2a) are as follows:

[Mathematical Expression 3]

$$0.08 < f1/(st1 \times ft/fw) < 0.17 \quad (1b)$$

$$1.9 < \beta3T/\beta3W < 3.4 \quad (2b)$$

By employing such a lens configuration, each embodiment realizes a compact, high-performance zoom lens system with a high zoom ratio.

Further, it is desirable that each embodiment satisfies at least one of conditional expressions provided below. Thus, effects according to the respective conditional expressions can be produced.

The second lens unit L2 includes, in order from the object side to the image side, three negative lens elements and one positive lens element. The lateral magnifications of the second lens unit L2 at the wide-angle end and at the telephoto end are denoted as $\beta2W$ and $\beta2T$, respectively.

The focal length of the second one of the negative lens elements counted from the object side in the second lens unit L2 is denoted as f22. That is, the second lens unit L2 includes, in order from the object side, a first negative lens element and a second negative lens element, and the focal length of the second negative lens element is denoted as f22. The focal length of the second lens unit L2 is denoted as f2.

Here, at least one of the following conditional expressions is satisfied:

[Mathematical Expression 4]

$$4.0 < \beta2T/\beta2W < 12.0 \quad (3)$$

$$1.0 < f22/f2 < 2.5 \quad (4)$$

Conditional Expression (3) expresses the magnification-changing effect of the second lens unit L2. If the lower limit of Conditional Expression (3) is exceeded, the magnification-changing effect of the second lens unit L2 is weakened. In order to compensate for the weakened magnification-changing effect by using the third lens unit L3, the optical power of the third lens unit L3 needs to be increased. Consequently, it becomes difficult to correct spherical aberration and field curvature at the wide-angle end.

In contrast, if the upper limit of Conditional Expression (3) is exceeded, the magnification-changing effect of the second lens unit L2 is enhanced and the total optical length can be reduced. However, it becomes difficult to suppress variations in field curvature caused by zooming.

Conditional Expression (4) expresses the allocation of the optical power set for the second one of the three negative lens elements counted from the object side in the second lens unit L2.

If the lower limit of Conditional Expression (4) is exceeded, the optical power of the foregoing negative lens element is increased. Hence, the spherical aberration at the telephoto end is observed on the under side. In contrast, if the upper limit of Conditional Expression (4) is exceeded, the optical power of the same negative lens element is reduced. Hence, it becomes difficult to suppress inward coma at the wide-angle end.

In each embodiment, in order to realize high optical performance while enabling better aberration correction and reducing variations in aberration during zooming, it is desirable to set Conditional Expressions (3) and (4) as follows:

[Mathematical Expression 5]

$$4.2 < \beta2T/\beta2W < 11.5 \quad (3a)$$

$$1.1 < f22/f2 < 2.4 \quad (4a)$$

More desirable settings of Conditional Expressions (3a) and (4a) are as follows:

[Mathematical Expression 6]

$$4.5 < \beta2T/\beta2W < 11.0 \quad (3b)$$

$$1.2 < f22/f2 < 2.3 \quad (4b)$$

By configuring the lens units as described above, the zoom lens system according to each embodiment realizes high optical performance throughout the zoom range and for objects at all distances in spite of its compactness and simple configuration.

Next, the configurations of the lens units in the zoom lens system according to each of the embodiments will be described.

The first lens unit L1 has an effective lens diameter larger than those of the other lens units. Therefore, the smaller the number of lens elements included in the first lens unit L1, the larger the weight reduction.

In each embodiment, the first lens unit L1 includes at least one negative lens element and at least two positive lens elements. For example, in each of the first to seventh embodiments, the first lens unit L1 includes, in order from the object side, one negative lens element and two positive lens elements. However, the present invention is not limited to such a configuration. The first lens unit L1 may include, in order from the object side, one negative lens element and three positive lens elements, or two negative lens elements and two (or three) positive lens elements. In addition, the two lens elements nearest to the object side in the first lens unit L1 form a cemented lens. Of course, each of these two lens elements may be a simple lens element.

More specifically, the first lens unit L1 includes, in order from the object side to the image side, a cemented lens and a simple positive lens element. The cemented lens includes a negative lens element that is a meniscus whose surface on the object side is convex and a positive lens element, the negative and positive lens elements being cemented together. With such a configuration, spherical aberration and chromatic aberration that tend to occur frequently when a high zoom ratio is set can be corrected well.

The second lens unit L2 includes, in order from the object side to the image side, a negative lens element that is a meniscus whose surface on the object side is convex, another negative lens element that is a meniscus whose surface on the object side is convex, another negative lens element whose surface on the object side is concave, and a positive lens element.

With such a configuration, variation in aberration during zooming is suppressed and, in particular, aberrations such as distortion at the wide-angle end and spherical aberration at the telephoto end are corrected well.

The third lens unit L3 includes, in order from the object side to the image side, a positive lens element whose surface on the object side is convex, two negative lens elements that are each a meniscus whose surface on the object side is convex, and a positive lens element whose surfaces on both sides are convex.

Further, the third lens unit L3 has at least one of its surfaces aspheric, whereby variations in aberration occurring during zooming is corrected well.

In each embodiment, with a cemented lens included in the third lens unit L3, variation in chromatic aberration during zooming is suppressed. Further, the third lens unit L3 is configured in such a manner that various aberrations caused by decentering of the third lens unit L3 for the purpose of performing image stabilization can be suppressed. In the decentering, the entirety or a part of the third lens unit L3 is shifted in a direction in which a component perpendicular to the optical axis is produced. The configuration of the third lens unit L3 will be described below in detail.

The third lens unit L3 according to the first embodiment includes, in order from the object side to the image side, a cemented lens in which a positive lens element whose surface on the object side is convex and a negative lens element that is a meniscus whose surface on the object side is convex are cemented together, and another cemented lens in which a negative lens element that is a meniscus whose surface on the object side is convex and a positive lens element are cemented together.

The third lens unit L3 according to each of the second to seventh embodiments includes, in order from the object side to the image side, a positive lens element whose surface on the object side is convex, a negative lens element that is a meniscus whose surface on the object side is convex, and a cemented lens in which a negative lens element that is a meniscus whose surface on the object side is convex and a positive lens element are cemented together.

The fourth lens unit L4 according to each of the first to seventh embodiments is a cemented lens in which a positive lens element whose surface on the object side is convex and a negative lens element are cemented together.

Next, Numerical Examples 1 to 7 corresponding to the first to seventh embodiments of the present invention will be given. In each Numerical Example, i denotes the order of the optical surface counted from the object side, Ri denotes the radius of curvature of the i-th optical surface (the i-th surface), Di denotes the distance between the i-th surface and the (i+1)-th surface, Ni and νi denotes the index of refraction and the Abbe number, respectively, of the material composing the i-th optical member for the d-line.

Further, when k denotes the eccentricity; B, C, D, E, F, G, and H denote aspherical coefficients; and x denotes the displacement from the surface vertex in the optical-axis direction at a height h from the optical axis, the shape of an aspherical surface is expressed as follows:

$$X=(h^2/R)/[1+[1-(1+k)(h/R)^2]^{1/2}]+Bh^4+Ch^6+Dh^8+Eh^{10}+Fh^{12}+Gh^{14}+Hh^{16}+\ldots$$

where R denotes the radius of curvature, "E-Z" denotes "$10^{-Z}$", f denotes the focal length, Fno denotes the f-number, and ω denotes the half angle of view.

In each Numerical Example, the last two surfaces are the surfaces of the optical block, such as a filter or a face plate.

Relationships between Conditional Expressions (1) to (4) described above and Numerical Examples 1 to 7 are summarized in Table 1.

Numerical Example 1

| f = 1~13.79 Fno = 2.87~5.74 2ω = 75.7°~6.5° | | | |
|---|---|---|---|
| R1 = 32.434 | D1 = 0.33 | N1 = 1.806100 | ν1 = 33.3 |
| R2 = 6.436 | D2 = 1.09 | N2 = 1.496999 | ν2 = 81.5 |
| R3 = −54.307 | D3 = 0.03 | | |
| R4 = 6.920 | D4 = 0.69 | N3 = 1.815500 | ν3 = 44.4 |
| R5 = 35.779 | D5 = variable | | |
| R6 = 7.063 | D6 = 0.19 | N4 = 1.882997 | ν3 = 40.8 |
| R7 = 2.083 | D7 = 0.44 | | |
| R8 = 6.301 | D8 = 0.17 | N5 = 1.806098 | ν4 = 40.9 |
| R9 = 1.729 | D9 = 0.71 | | |
| R10 = −5.324 | D10 = 0.14 | N6 = 1.712995 | ν5 = 53.9 |
| R11 = 8.550 | D11 = 0.02 | | |
| R12 = 3.544 | D12 = 0.45 | N7 = 1.846660 | ν6 = 23.9 |
| R13 = −13.641 | D13 = variable | | |
| R14 = stop | D14 = variable | | |
| R15* = 1.556 | D15 = 0.41 | N8 = 1.806100 | ν7 = 40.7 |
| R16 = 2.276 | D16 = 0.48 | N9 = 1.846660 | ν8 = 23.9 |
| R17 = 1.821 | D17 = 0.08 | | |
| R18 = 3.432 | D18 = 0.18 | N10 = 2.003300 | ν9 = 28.3 |
| R19 = 1.063 | D19 = 0.39 | N11 = 1.693501 | ν10 = 53.2 |
| R20 = −4.790 | D20 = variable | | |
| R21 = 4.184 | D21 = 0.42 | N12 = 1.772499 | ν11 = 49.6 |
| R22 = −5.508 | D22 = 0.11 | N13 = 1.755199 | ν12 = 27.5 |
| R23 = 13.760 | D23 = variable | | |
| R24 = ∞ | D24 = 0.14 | N14 = 1.516330 | ν13 = 64.1 |
| R25 = ∞ | | | |

| Zoom ratio 13.79 | | | |
|---|---|---|---|
| Focal length | 1.00 | 7.20 | 13.79 |
| F-number | 2.87 | 4.11 | 5.74 |
| Angle of view | 37.9 | 10.3 | 3.3 |
| Image height | 0.75 | 0.75 | 0.75 |
| Total lens length | 16.0 | 18.0 | 21.6 |
| BF | 1.80 | 2.83 | 1.60 |
| D5 | 0.17 | 6.23 | 7.61 |
| D13 | 4.14 | 0.45 | 0.17 |
| D14 | 1.58 | 0.35 | 0.19 |
| D20 | 1.08 | 2.35 | 4.81 |
| D23 | 1.37 | 2.58 | 1.16 |

| Unit | Front surface | Focal length |
|---|---|---|
| 1 | 1 | 11.98 |
| 2 | 6 | −1.96 |
| 3 | 15 | 3.41 |
| 4 | 21 | 7.37 |

| Aspherical coefficient | | | |
|---|---|---|---|
| R15 | k = −9.55612e−02 | B = −1.04850e−02 | C = −1.61836e−03 |
| | D = −1.27707e−03 | E = 4.74964e−04 | F = 0.00000e+00 |
| | G = 0.00000e+00 | H = 0.00000e+00 | |

Numerical Example 2

| f = 1~13.71 Fno = 2.89~5.57 2ω = 75.2°~6.4° | | | |
|---|---|---|---|
| R1 = 13.578 | D1 = 0.33 | N1 = 1.806100 | ν1 = 33.3 |
| R2 = 5.850 | D2 = 1.02 | N2 = 1.496999 | ν2 = 81.5 |
| R3 = 162.493 | D3 = 0.03 | | |
| R4 = 6.244 | D4 = 0.76 | N3 = 1.696797 | ν3 = 55.5 |

-continued

| f = 1~13.71 Fno = 2.89~5.57 2ω = 75.2°~6.4° | | | |
|---|---|---|---|
| R5 = 31.628 | D5 = variable | | |
| R6 = 9.845 | D6 = 0.18 | N4 = 1.882997 | ν4 = 40.8 |
| R7 = 1.798 | D7 = 0.45 | | |
| R8 = 6.219 | D8 = 0.15 | N5 = 1.882997 | ν5 = 40.8 |
| R9 = 1.859 | D9 = 0.58 | | |
| R10 = −4.443 | D10 = 0.14 | N6 = 1.806100 | ν6 = 33.3 |
| R11 = 58.969 | D11 = 0.02 | | |
| R12 = 4.038 | D12 = 0.29 | N7 = 1.922860 | ν7 = 18.9 |
| R13 = −14.018 | D13 = variable | | |
| R14 = stop | D14 = variable | | |
| R15* = 1.846 | D15 = 0.62 | N8 = 1.583126 | ν8 = 59.4 |
| R16 = 64.350 | D16 = 0.41 | | |
| R17 = 7.983 | D17 = 0.21 | N9 = 1.581439 | ν9 = 40.8 |
| R18 = 1.994 | D18 = 0.05 | | |
| R19 = 3.003 | D19 = 0.14 | N10 = 2.003300 | ν10 = 28.3 |
| R20 = 1.332 | D20 = 0.39 | N11 = 1.712995 | ν11 = 53.9 |
| R21 = −7.630 | D21 = variable | | |
| R22 = 4.487 | D22 = 0.41 | N12 = 1.754998 | ν12 = 52.3 |
| R23 = −3.750 | D23 = 0.10 | N13 = 1.834000 | ν13 = 37.2 |
| R24 = 19.645 | D24 = variable | | |
| R25 = ∞ | D25 = 0.14 | N14 = 1.516330 | ν14 = 64.1 |
| R26 = ∞ | | | |

| Zoom ratio 13.71 | | | |
|---|---|---|---|
| | Wide-angle | Intermediate | Telephoto |
| Focal length | 1.00 | 8.07 | 13.71 |
| F-number | 2.87 | 3.88 | 5.57 |
| Angle of view | 37.6 | 12.4 | 3.2 |
| Image height | 0.75 | 0.75 | 0.75 |
| Total lens length | 14.8 | 15.9 | 19.7 |
| BF | 1.87 | 3.08 | 1.79 |
| D5 | 0.17 | 5.63 | 6.56 |
| D13 | 3.92 | 0.45 | 0.26 |
| D14 | 1.47 | 0.28 | 0.19 |
| D21 | 1.07 | 1.99 | 4.61 |
| D24 | 1.45 | 3.03 | 1.37 |

| Unit | Front surface | Focal length |
|---|---|---|
| 1 | 1 | 10.71 |
| 2 | 6 | −1.68 |
| 3 | 15 | 3.32 |
| 4 | 22 | 9.29 |

| Aspherical coefficient | | | |
|---|---|---|---|
| R16 | k = −1.12605e−01 | B = −1.29138e−02 | C = 1.74008e−03 |
| | D = −8.76570e−03 | E = 6.98905e−03 | F = 0.00000e+00 |
| | G = 0.00000e+00 | H = 0.00000e+00 | |

Numerical Example 3

| f = 1~13.73 Fno = 2.87~5.50 2ω = 75.3°~6.4° | | | |
|---|---|---|---|
| R1 = 13.647 | D1 = 0.33 | N1 = 1.806100 | ν1 = 33.3 |
| R2 = 5.864 | D2 = 1.02 | N2 = 1.496999 | ν2 = 81.5 |
| R3 = 170.503 | D3 = 0.03 | | |
| R4 = 6.267 | D4 = 0.76 | N3 = 1.696797 | ν3 = 55.5 |
| R5 = 32.141 | D5 = variable | | |
| R6 = 9.863 | D6 = 0.18 | N4 = 1.882997 | ν4 = 40.8 |
| R7 = 1.793 | D7 = 0.46 | | |
| R8 = 6.243 | D8 = 0.15 | N5 = 1.882997 | ν5 = 40.8 |
| R9 = 1.862 | D9 = 0.58 | | |
| R10 = −4.514 | D10 = 0.14 | N6 = 1.806100 | ν6 = 33.3 |
| R11 = 50.598 | D11 = 0.02 | | |
| R12 = 3.975 | D12 = 0.29 | N7 = 1.922860 | ν7 = 18.9 |
| R13 = −13.670 | D13 = variable | | |
| R14 = stop | D14 = variable | | |
| R15* = 1.868 | D15 = 0.62 | N8 = 1.583126 | ν8 = 59.4 |
| R16 = 32.615 | D16 = 0.41 | | |
| R17 = 5.511 | D17 = 0.21 | N9 = 1.582673 | ν9 = 46.4 |
| R18 = 2.135 | D18 = 0.04 | | |
| R19 = 3.024 | D19 = 0.14 | N10 = 2.003300 | ν10 = 28.3 |
| R20 = 1.265 | D20 = 0.39 | N11 = 1.696797 | ν11 = 55.5 |
| R21 = −9.816 | D21 = variable | | |
| R22 = 4.511 | D22 = 0.41 | N12 = 1.754998 | ν12 = 52.3 |
| R23 = −4.113 | D23 = 0.10 | N13 = 1.834000 | ν13 = 37.2 |
| R24 = 27.588 | D24 = variable | | |
| R25 = ∞ | D25 = 0.14 | N14 = 1.516330 | ν14 = 64.1 |
| R26 = ∞ | | | |

| Zoom ratio 13.73 | | | |
|---|---|---|---|
| | Wide-angle | Intermediate | Telephoto |
| Focal length | 1.00 | 7.96 | 13.73 |
| F-number | 2.87 | 3.84 | 5.50 |
| Angle of view | 37.7 | 12.6 | 3.2 |
| Image height | 0.75 | 0.75 | 0.75 |
| Total lens length | 14.8 | 16.0 | 19.7 |
| BF | 1.89 | 3.02 | 1.85 |
| D5 | 0.17 | 5.65 | 6.60 |
| D13 | 3.95 | 0.47 | 0.26 |
| D14 | 1.48 | 0.28 | 0.19 |
| D21 | 1.05 | 2.10 | 4.57 |
| D24 | 1.45 | 2.91 | 1.40 |

| Unit | Front surface | Focal length |
|---|---|---|
| 1 | 1 | 10.72 |
| 2 | 6 | −1.71 |
| 3 | 15 | 3.37 |
| 4 | 22 | 8.33 |

| Aspherical coefficient | | | |
|---|---|---|---|
| R15 | k = −6.27526e−02 | B = −1.31808e−02 | C = 1.82424e−03 |
| | D = −8.73109e−03 | E = 6.90110e−03 | F = 0.00000e+00 |
| | G = 0.00000e+00 | H = 0.00000e+00 | |

Numerical Example 4

| f = 1~13.72 Fno = 2.87~5.53 2ω = 75.3°~6.4° | | | |
|---|---|---|---|
| R1 = 13.538 | D1 = 0.33 | N1 = 1.806100 | ν1 = 33.3 |
| R2 = 5.876 | D2 = 1.02 | N2 = 1.496999 | ν2 = 81.5 |
| R3 = 174.059 | D3 = 0.03 | | |
| R4 = 6.224 | D4 = 0.77 | N3 = 1.696797 | ν3 = 55.5 |
| R5 = 31.540 | D5 = variable | | |
| R6 = 9.879 | D6 = 0.18 | N4 = 1.882997 | ν4 = 40.8 |
| R7 = 1.787 | D7 = 0.46 | | |
| R8 = 6.216 | D8 = 0.15 | N5 = 1.882997 | ν5 = 40.8 |
| R9 = 1.861 | D9 = 0.59 | | |
| R10 = −4.409 | D10 = 0.14 | N6 = 1.806100 | ν6 = 33.3 |
| R11 = 61.564 | D11 = 0.02 | | |
| R12 = 4.113 | D12 = 0.37 | N7 = 1.922860 | ν7 = 18.9 |
| R13 = −13.257 | D13 = variable | | |
| R14 = stop | D14 = variable | | |
| R15* = 1.837 | D15 = 0.62 | N8 = 1.583126 | ν8 = 59.4 |
| R16 = 60.337 | D16 = 0.44 | | |
| R17 = 8.527 | D17 = 0.21 | N9 = 1.595509 | ν9 = 39.2 |
| R18 = 1.974 | D18 = 0.05 | | |
| R19 = 3.006 | D19 = 0.14 | N10 = 2.003300 | ν10 = 28.3 |
| R20 = 1.370 | D20 = 0.39 | N11 = 1.712995 | ν11 = 53.9 |
| R21 = −7.728 | D21 = variable | | |
| R22 = 4.418 | D22 = 0.41 | N12 = 1.754998 | ν12 = 52.3 |

-continued

| f = 1~13.72 Fno = 2.87~5.53 2ω = 75.3°~6.4° | | | |
|---|---|---|---|
| R23 = −3.797 | D23 = 0.10 | N13 = 1.834000 | ν13 = 37.2 |
| R24 = 22.664 | D24 = variable | | |
| R25 = ∞ | D25 = 0.14 | N14 = 1.516330 | ν14 = 64.1 |
| R26 = ∞ | | | |

Zoom ratio 13.72

| | Wide-angle | Intermediate | Telephoto |
|---|---|---|---|
| Focal length | 1.00 | 8.00 | 13.72 |
| F-number | 2.87 | 3.85 | 5.53 |
| Angle of view | 37.7 | 12.6 | 3.2 |
| Image height | 0.75 | 0.75 | 0.75 |
| Total lens length | 14.9 | 16.0 | 19.8 |
| BF | 1.91 | 3.08 | 1.83 |
| D5 | 0.17 | 5.59 | 6.53 |
| D13 | 3.84 | 0.44 | 0.26 |
| D14 | 1.52 | 0.29 | 0.19 |
| D21 | 1.04 | 2.04 | 4.58 |
| D24 | 1.50 | 3.00 | 1.41 |

| Unit | Front surface | Focal length |
|---|---|---|
| 1 | 1 | 10.61 |
| 2 | 6 | −1.68 |
| 3 | 15 | 3.37 |
| 4 | 22 | 8.63 |

Aspherical coefficient

| R15 | k = −5.82469e−02 | B = −1.38910e−02 | C = 7.57297e−04 |
|---|---|---|---|
| | D = −8.91734e−03 | E = 6.88889e−03 | F = 0.00000e+00 |
| | G = 0.00000e+00 | H = 0.00000e+00 | |

Numerical Example 5

| f = 1~17.0 Fno = 2.87~5.74 2ω = 75.4°~5.1° | | | |
|---|---|---|---|
| R1 = 13.891 | D1 = 0.33 | N1 = 1.806100 | ν1 = 33.3 |
| R2 = 5.854 | D2 = 1.03 | N2 = 1.496999 | ν2 = 81.5 |
| R3 = 232.443 | D3 = 0.03 | | |
| R4 = 6.680 | D4 = 0.76 | N3 = 1.729157 | ν3 = 54.7 |
| R5 = 49.490 | D5 = variable | | |
| R6 = 12.500 | D6 = 0.18 | N4 = 1.882997 | ν4 = 40.8 |
| R7 = 1.810 | D7 = 0.44 | | |
| R8 = 5.862 | D8 = 0.15 | N5 = 1.882997 | ν5 = 40.8 |
| R9 = 1.872 | D9 = 0.59 | | |
| R10 = −4.349 | D10 = 0.14 | N6 = 1.806100 | ν6 = 33.3 |
| R11 = 51.393 | D11 = 0.02 | | |
| R12 = 4.005 | D12 = 0.33 | N7 = 1.922860 | ν7 = 18.9 |
| R13 = −13.683 | D13 = variable | | |
| R14 = stop | D14 = variable | | |
| R15* = 1.874 | D15 = 0.62 | N8 = 1.583126 | ν8 = 59.4 |
| R16 = 144.162 | D16 = 0.52 | | |
| R17 = 9.133 | D17 = 0.21 | N9 = 1.595509 | ν9 = 39.2 |
| R18 = 2.049 | D18 = 0.04 | | |
| R19 = 3.024 | D19 = 0.14 | N10 = 2.003300 | ν10 = 28.3 |
| R20 = 1.319 | D20 = 0.39 | N11 = 1.712995 | ν11 = 53.9 |
| R21 = −9.408 | D21 = variable | | |
| R22 = 3.978 | D22 = 0.41 | N12 = 1.772499 | ν12 = 49.6 |
| R23 = −4.003 | D23 = 0.10 | N13 = 1.834000 | ν13 = 37.2 |
| R24 = 25.603 | D24 = variable | | |
| R25 = ∞ | D25 = 0.14 | N14 = 1.516330 | ν14 = 64.1 |
| R26 = ∞ | | | |

Zoom ratio 17.0

| | Wide-angle | Intermediate | Telephoto |
|---|---|---|---|
| Focal length | 1.00 | 8.40 | 17.00 |
| F-number | 2.87 | 3.68 | 5.74 |
| Angle of view | 37.7 | 12.4 | 2.5 |
| Image height | 0.75 | 0.75 | 0.75 |
| Total lens length | 15.0 | 16.1 | 20.4 |
| BF | 1.88 | 3.09 | 0.98 |
| D5 | 0.17 | 5.66 | 6.57 |
| D13 | 3.93 | 0.42 | 0.28 |
| D14 | 1.42 | 0.23 | 0.23 |
| D21 | 1.14 | 2.16 | 5.96 |
| D24 | 1.44 | 2.93 | 0.54 |

| Unit | Front surface | Focal length |
|---|---|---|
| 1 | 1 | 10.26 |
| 2 | 6 | −1.67 |
| 3 | 15 | 3.53 |
| 4 | 22 | 6.72 |

Aspherical coefficient

| R15 | k = −1.28224e−01 | B = −1.20097e−02 | C = 2.31091e−03 |
|---|---|---|---|
| | D = −8.60297e−03 | E = 5.31285e−03 | F = 0.00000e+00 |
| | G = 0.00000e+00 | H = 0.00000e+00 | |

Numerical Example 6

| f = 1~20.5 Fno = 2.87~5.74 2ω = 75.4°~4.19° | | | |
|---|---|---|---|
| R1 = 13.689 | D1 = 0.33 | N1 = 1.806100 | ν1 = 33.3 |
| R2 = 5.772 | D2 = 1.02 | N2 = 1.496999 | ν2 = 81.5 |
| R3 = 286.543 | D3 = 0.03 | | |
| R4 = 6.590 | D4 = 0.76 | N3 = 1.691002 | ν3 = 54.8 |
| R5 = 57.149 | D5 = variable | | |
| R6 = 12.921 | D6 = 0.18 | N4 = 1.882997 | ν4 = 40.8 |
| R7 = 1.829 | D7 = 0.44 | | |
| R8 = 6.079 | D8 = 0.15 | N5 = 1.834807 | ν5 = 42.7 |
| R9 = 1.881 | D9 = 0.58 | | |
| R10 = −4.380 | D10 = 0.14 | N6 = 1.806100 | ν6 = 33.3 |
| R11 = 40.602 | D11 = 0.02 | | |
| R12 = 4.014 | D12 = 0.28 | N7 = 1.922860 | ν7 = 18.9 |
| R13 = −13.918 | D13 = variable | | |
| R14 = stop | D14 = variable | | |
| R15* = 1.821 | D15 = 0.62 | N8 = 1.583126 | ν8 = 59.4 |
| R16 = −19.233 | D16 = 0.55 | | |
| R17 = 18.158 | D17 = 0.21 | N9 = 1.605620 | ν9 = 43.7 |
| R18 = 2.016 | D18 = 0.05 | | |
| R19 = 3.308 | D19 = 0.12 | N10 = 2.003300 | ν10 = 28.3 |
| R20 = 1.299 | D20 = 0.39 | N11 = 1.712995 | ν11 = 53.9 |
| R21 = −13.296 | D21 = variable | | |
| R22 = 3.503 | D22 = 0.41 | N12 = 1.754998 | ν12 = 52.3 |
| R23 = −4.582 | D23 = 0.10 | N13 = 1.834000 | ν13 = 37.2 |
| R24 = 274.040 | D24 = variable | | |
| R25 = ∞ | D25 = 0.14 | N14 = 1.516330 | ν14 = 64.1 |
| R26 = ∞ | | | |

Zoom ratio 20.5

| | Wide-angle | Intermediate | Telephoto |
|---|---|---|---|
| Focal length | 1.00 | 8.46 | 20.50 |
| F-number | 2.87 | 4.20 | 5.74 |
| Angle of view | 37.7 | 5.07 | 2.10 |
| Image height | 0.75 | 0.75 | 0.75 |
| Total lens length | 13.15 | 15.33 | 19.58 |
| BF | 1.94 | 3.45 | 1.23 |
| D5 | 0.17 | 5.83 | 7.01 |
| D13 | 3.98 | 0.49 | 0.26 |
| D14 | 1.55 | 0.24 | 0.21 |
| D21 | 1.08 | 2.38 | 5.72 |
| D24 | 1.51 | 3.01 | 0.79 |

-continued f = 1~20.5 Fno = 2.87~5.74 2ω = 75.4°~4.19°

| Unit | Front surface | Focal length |
|---|---|---|
| 1 | 1 | 10.40 |
| 2 | 6 | −1.69 |
| 3 | 15 | 3.80 |
| 4 | 22 | 5.09 |

Aspherical coefficient

| R15 | k = −3.07164e−01 | B = −1.04243e−02 | C = 3.00760e−03 |
|---|---|---|---|
| | D = −9.93328e−03 | E = 7.79403e−03 | F = 0.00000e+00 |
| | G = 0.00000e+00 | H = 0.00000e+00 | |

-continued f = 1~19.87 Fno = 2.85~5.86 2ω = 72.6°~4.24°

| | | | |
|---|---|---|---|
| Image height | 0.74 | 0.74 | 0.74 |
| Total lens length | 19.45 | 21.11 | 24.69 |
| BF | 1.80 | 3.37 | 1.02 |
| D5 | 0.15 | 6.66 | 7.88 |
| D13 | 8.24 | 1.15 | 0.35 |
| D21 | 1.56 | 2.24 | 7.70 |
| D24 | 1.07 | 2.64 | 0.30 |

| Unit | Front surface | Focal length |
|---|---|---|
| 1 | 1 | 12.94 |
| 2 | 6 | −2.12 |
| 3 | 14 | 4.21 |
| 4 | 22 | 7.37 |

| R15 | k = 2.37811e−02 | B = −8.54193e−03 | C = −1.72413e−03 |
|---|---|---|---|
| | D = 2.00566e−04 | E = −3.48028e−04 | F = 0.00000e+00 |
| | G = 0.00000e+00 | H = 0.00000e+00 | |

TABLE 1

| | Numerical Example 1 | Numerical Example 2 | Numerical Example 3 | Numerical Example 4 | Numerical Example 5 | Numerical Example 6 | Numerical Example 7 |
|---|---|---|---|---|---|---|---|
| (1) | 0.16 | 0.16 | 0.16 | 0.16 | 0.11 | 0.09 | 0.12 |
| (2) | 2.71 | 2.73 | 2.68 | 2.65 | 2.32 | 1.92 | 3.26 |
| (3) | 4.90 | 4.97 | 5.09 | 5.13 | 6.10 | 8.50 | 5.30 |
| (4) | 1.54 | 1.81 | 1.79 | 1.82 | 1.90 | 1.96 | 2.23 |

Numerical Example 7 f = 1~19.87 Fno = 2.85~5.86 2ω = 72.6°~4.24°

| | | | |
|---|---|---|---|
| R1 = 13.616 | D1 = 0.38 | N1 = 1.806100 | ν1 = 33.3 |
| R2 = 7.075 | D2 = 1.21 | N2 = 1.496999 | ν2 = 81.5 |
| R3 = 173.509 | D3 = 0.02 | | |
| R4 = 6.966 | D4 = 0.80 | N3 = 1.603112 | ν3 = 60.6 |
| R5 = 27.466 | D5 = variable | | |
| R6 = 10.765 | D6 = 0.21 | N4 = 1.882997 | ν4 = 40.8 |
| R7 = 2.023 | D7 = 0.78 | | |
| R8 = 12.065 | D8 = 0.16 | N5 = 1.882997 | ν5 = 40.8 |
| R9 = 3.084 | D9 = 0.75 | | |
| R10 = −6.569 | D10 = 0.14 | N6 = 1.834000 | ν6 = 37.2 |
| R11 = 185.126 | D11 = 0.02 | | |
| R12 = 5.423 | D12 = 0.48 | N7 = 1.922860 | ν7 = 18.9 |
| R13 = −24.794 | D13 = variable | | |
| R14 = stop | D14 = 0.27 | | |
| R15* = 1.994 | D15 = 0.63 | N8 = 1.693500 | ν8 = 53.2 |
| R16 = 11.713 | D16 = 0.35 | | |
| R17 = 3.422 | D17 = 0.20 | N9 = 1.806100 | ν9 = 33.3 |
| R18 = 1.867 | D18 = 0.09 | | |
| R19 = 3.666 | D19 = 0.12 | N10 = 2.003300 | ν10 = 28.3 |
| R20 = 1.344 | D20 = 0.45 | N11 = 1.743997 | ν11 = 44.8 |
| R21 = −57.563 | D21 = variable | | |
| R22 = 4.406 | D22 = 0.53 | N12 = 1.743198 | ν12 = 49.3 |
| R23 = −4.213 | D23 = 0.10 | N13 = 1.688931 | ν13 = 31.1 |
| R24 = 14.312 | D24 = variable | | |
| R25 = ∞ | D25 = 0.14 | N14 = 1.516330 | ν14 = 64.1 |
| R26 = ∞ | | | |

Zoom ratio 19.87

| | Wide-angle | Intermediate | Telephoto |
|---|---|---|---|
| Focal length | 1.00 | 7.77 | 19.87 |
| F-number | 2.85 | 3.75 | 5.86 |
| Angle of view | 37.7 | 5.07 | 2.10 |

Next, a digital still camera according to an eighth embodiment of the present invention will be described with reference to FIG. 29. The digital still camera includes the zoom lens system according to any of the first to seventh embodiments as an image taking optical system.

In FIG. 29, a camera body 20 is provided with an image taking optical system 21, which is the zoom lens system described in any of the first to seventh embodiments. The camera body 20 houses a solid-state image pickup device (photoelectric conversion element) 22, such as a CCD sensor or a CMOS sensor, that receives the light of an object image formed by the image taking optical system 21. The camera body 20 is also provided with a memory 23 that stores information on the object image that has been subjected to photoelectric conversion performed by the solid-state image pickup device 22, and a view finder 24, such as a liquid crystal display panel, through which the object image formed on the solid-state image pickup device 22 is observed.

By applying the zoom lens system according to any of the embodiments of the present invention to an image pickup apparatus such as a digital still camera, a compact image pickup apparatus having high optical performance can be provided.

According to the above embodiments, a zoom lens system and an image pickup apparatus including the same can be realized with high optical performance throughout the zoom range, from the wide-angle view to the telephoto end, and for objects at all distances, including an object at infinity and a near object, in spite of it having a wide angle of view and a high zoom ratio.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-203963 filed Aug. 6, 2007, which is hereby incorporated by reference herein in its entirety.

What is claimed is:

1. A zoom lens system comprising, in order from an object side to an image side:
    a first lens unit having a positive optical power, the first lens unit including one negative lens element and two positive lens elements;
    a second lens unit having a negative optical power;
    a third lens unit having a positive optical power; and
    a fourth lens unit having a positive optical power,
    wherein the first lens unit moves during zooming, and
    wherein the following condition is satisfied:

$$0.05 < f1/(st1 \times ft/fw) < 0.2$$

$$1.5 < \beta 3T/\beta 3W < 3.6$$

where f1 denotes a focal length of the first lens unit, st1 denotes a distance between positions of the first lens unit at a wide-angle end and at a telephoto end, fw and ft denote focal lengths of the entire system at the wide-angle end and at the telephoto end, respectively, and $\beta 3W$ and $\beta 3T$ denote lateral magnifications of the third lens unit at the wide-angle end and at the telephoto end, respectively.

2. The zoom lens system according to claim 1,
    wherein the second lens unit includes, in order from the object side to the image side, three negative lens elements and one positive lens element, and
    wherein the following condition is satisfied:

$$4.0 < \beta 2T/\beta 2W < 12.0$$

where $\beta 2W$ and $\beta 2T$ denote lateral magnifications of the second lens unit at the wide-angle end and at the telephoto end, respectively.

3. The zoom lens system according to claim 1,
    wherein the second lens unit includes, in order from the object side, a first negative lens element and a second negative lens element,
    wherein the following condition is satisfied:

$$1.0 < f22/f2 < 2.5$$

where f22 denotes a focal length of the second negative lens element, and f2 denotes a focal length of the second lens unit.

4. The zoom lens system according to claim 1,
    wherein the second lens unit includes, in order from the object side to the image side, a negative lens element that is a meniscus whose surface on the object side is convex, another negative lens element that is a meniscus whose surface on the object side is convex, another negative lens element whose surface on the object side is concave, and a positive lens element.

5. The zoom lens system according to claim 1,
    wherein the third lens unit includes, in order from the object side to the image side, a positive lens element whose surface on the object side is convex, two negative lens elements that are each a meniscus whose surface on the object side is convex, and a positive lens element whose surfaces on both sides are convex.

6. The zoom lens system according to claim 1,
    wherein the entirety or a part of the third lens unit is shifted in a direction in which a component perpendicular to an optical axis is produced, whereby a position of an image to be taken is corrected in the event where the zoom lens system is shaken.

7. The zoom lens system according to claim 1,
    wherein the zoom lens system forms an image on a solid-state image pickup device.

8. An image pickup apparatus comprising:
    a solid-state image pickup device; and
    a zoom lens system configured to form an image on the solid-state image pickup device,
    wherein the zoom lens system includes, in order from an object side to an image side,
        a first lens unit having a positive optical power, the first lens unit including one negative lens element and two positive lens elements;
        a second lens unit having a negative optical power;
        a third lens unit having a positive optical power; and
        a fourth lens unit having a positive optical power,
            wherein the first lens unit moves during zooming, and
    wherein the following condition is satisfied:

$$0.05 < f1/(st1 \times ft/fw) < 0.2$$

$$1.5 < \beta 3T/\beta 3W < 3.6$$

where f1 denotes a focal length of the first lens unit, st1 denotes a distance between positions of the first lens unit at a wide-angle end and at a telephoto end, fw and ft denote focal lengths of the entire system at the wide-angle end and at the telephoto end, respectively, and $\beta 3W$ and $\beta 3T$ denote lateral magnifications of the third lens unit at the wide-angle end and at the telephoto end, respectively.

* * * * *